US012728618B2

(12) United States Patent
Thostenson et al.

(10) Patent No.: US 12,728,618 B2
(45) Date of Patent: Sep. 8, 2026

(54) CARBON NANOTUBE BASED SENSOR

(71) Applicant: University of Delaware, Newark, DE (US)

(72) Inventors: Erik Thostenson, Newark, DE (US); Sagar Doshi, Newark, DE (US)

(73) Assignee: University of Delaware, Newark, DE (US)

( * ) Notice: Subject to any disclaimer, the term of this patent is extended or adjusted under 35 U.S.C. 154(b) by 734 days.

(21) Appl. No.: 16/606,615

(22) PCT Filed: Apr. 19, 2018

(86) PCT No.: PCT/US2018/028329
§ 371 (c)(1),
(2) Date: Oct. 18, 2019

(87) PCT Pub. No.: WO2018/195295
PCT Pub. Date: Oct. 25, 2018

(65) Prior Publication Data

US 2020/0180264 A1 Jun. 11, 2020

Related U.S. Application Data

(60) Provisional application No. 62/487,006, filed on Apr. 19, 2017, provisional application No. 62/492,980,
(Continued)

(51) Int. Cl.
*B32B 5/26* (2006.01)
*B82Y 30/00* (2011.01)
(Continued)

(52) U.S. Cl.
CPC ................ *B32B 5/26* (2013.01); *C08J 5/005* (2013.01); *G01L 1/18* (2013.01); *G01M 5/0033* (2013.01);
(Continued)

(58) Field of Classification Search
CPC ....... G01L 1/18; B32B 5/26; B32B 2260/046; B82Y 30/00; B82Y 40/00; C08J 5/005; G01M 5/0033; G01M 5/0083
See application file for complete search history.

(56) References Cited

U.S. PATENT DOCUMENTS 8,161,826 B1 * 4/2012 Taylor .................. A47C 27/082 73/862.041
9,776,916 B2 * 10/2017 Thostenson .......... C09D 5/4419
(Continued)

OTHER PUBLICATIONS

International Preliminary Report on Patentability and Written Opinion for International Application No. PCT/US2018/028329, Issued Mar. 3, 2020, 11 pages.
(Continued)

*Primary Examiner* — Lynda Salvatore
(74) *Attorney, Agent, or Firm* — Jeffrey R. Ramberg; Stephen J. Weed; Bradley Yops

(57) ABSTRACT

A carbon nanotube-based sensor comprises a fabric, and a plurality of carbon nanotubes coated on the fabric. The plurality of carbon nanotubes form a network in a plane of the fabric. At least two tap points are coupled to the plurality of carbon nanotubes coated on the fabric. A first of the plurality of tap points is separated from a second of the plurality of tap points, where the first and second tap points have a resistance there between. Application of a force on the fabric, from outside the plane of the fabric, causes a change in the resistance between the first and second tap points.

44 Claims, 21 Drawing Sheets

Related U.S. Application Data filed on May 2, 2017, provisional application No. 62/501,141, filed on May 4, 2017.

(51) Int. Cl.

| | |
|---|---|
| ***B82Y 40/00*** | (2011.01) |
| ***C08J 5/00*** | (2006.01) |
| ***G01L 1/18*** | (2006.01) |
| ***G01M 5/00*** | (2006.01) |

(52) U.S. Cl.

CPC ......... *B32B 2260/046* (2013.01); *B82Y 30/00* (2013.01); *B82Y 40/00* (2013.01)

(56) References Cited

U.S. PATENT DOCUMENTS

| | | | | |
|---|---|---|---|---|
| 2004/0245463 | A1 | 12/2004 | Wood et al. | |
| 2005/0095938 | A1* | 5/2005 | Rosenberger .......... | D03D 15/00 442/302 |
| 2015/0044656 | A1* | 2/2015 | Eichhorn ................ | A61B 5/11 600/587 |
| 2017/0146493 | A1* | 5/2017 | Passmore ............... | A61B 5/489 |

OTHER PUBLICATIONS

U.S. Appl. No. 61/932,465, filed Jan. 28, 2014, 51 pages.

U.S. Appl. No. 61/941,686, filed Feb. 19, 2014, 27 pages.

An et al., "Hierarchical Composite Structures Prepared by Electrophoretic Deposition of Carbon Nanotubes onto Glass Fibers", ACS Appl. Mater. Interfaces, 2013, pp. 2022-2032.

Dai et al., "Processing and Characterization of a Novel Distributed Strain Sensor using Carbon Nanotube-Based Nonwoven Composites", Sensors, 2015, pp. 17728-17747.

Gerlach et al., "Printed MWCNT-PDMS-Composite Pressure Sensor System for Plantar Pressure Monitoring in Ulcer Prevention", IEEE Sensors Journal, Jul. 2015, 11 pages.

International Search Report and Written Opinion for International Application No. PCT/US2018/028329, dated Aug. 13, 2018, 14 pages.

Hyeon Jun Sim, Changsoon Choi, Chang Jun Lee, Youn Tae Kim, Geoffrey M. Spinks, Marcio D. Lima, Ray H. Baughman and Sean Jeong Kim, "Flexible, Stretachable and Weavable Piezoelectric Fiber", Advanced Engineering Materials, 2015, pp. 1270-1275, vol. 17, No. 9, Wiley-VCH Verlag GmbH & Co. KGaA, Weinheim.

* cited by examiner

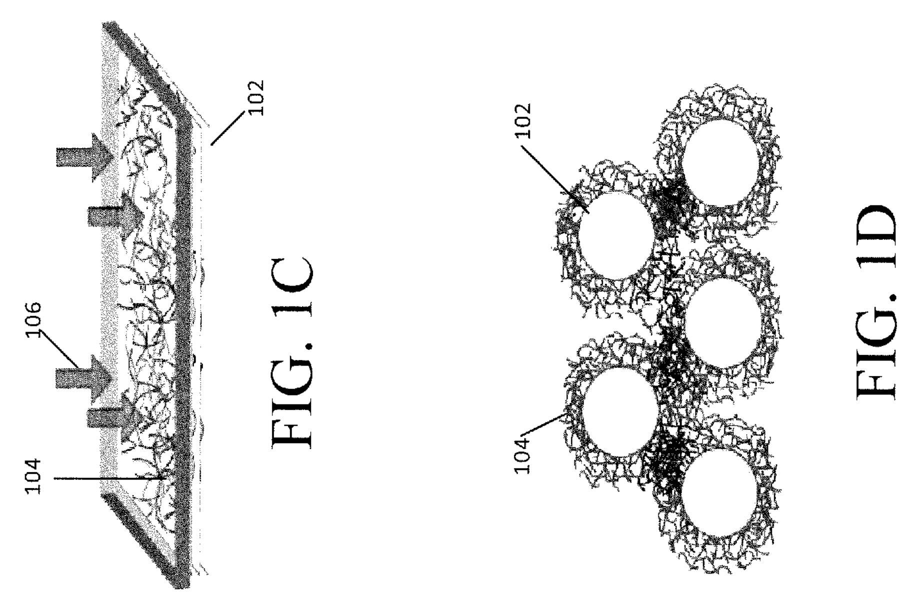
FIG. 1C
FIG. 1D
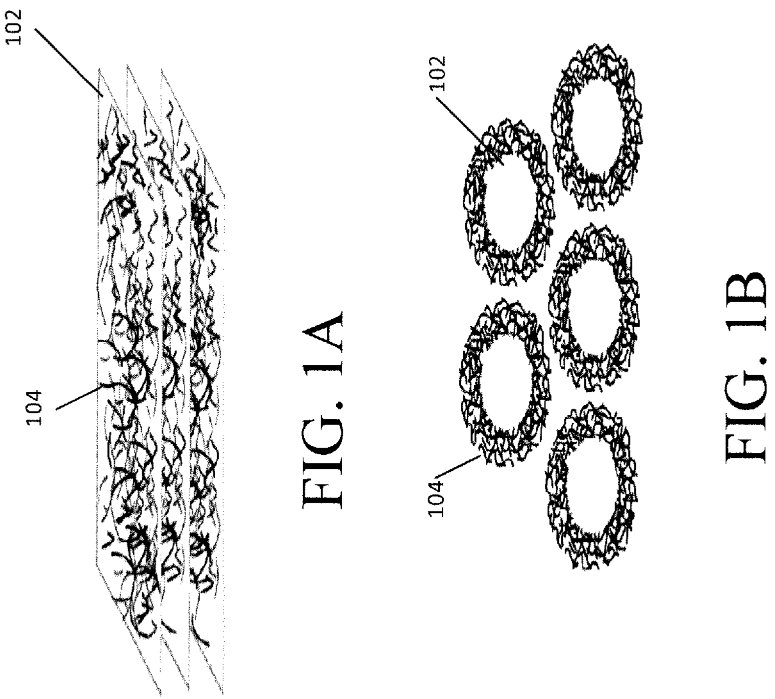
FIG. 1A
FIG. 1B

CARBON NANOTUBE BASED SENSOR

CROSS-REFERENCE TO RELATED APPLICATION

This application claims priority to U.S. Provisional Application No. 62/487,006, filed Apr. 19, 2017, U.S. Provisional Application No. 62/492,980, filed May 2, 2017, and U.S. Provisional Application No. 62/501,141, filed May 4, 2017, the disclosures of which are incorporated herein by reference in their entirety for all purposes.

FEDERAL FUNDING

This invention was made with government support under Grant No. DTFH31-13-H00010 awarded by the Federal Highway Administration. Acknowledgement is further made of support from the Delaware Idea Networks of Biomedical Research Excellence (INBRE) program with a grant from the National Institute of General Medical Sciences (NIGMS) Grant No. P20 GM103446), and the state of Delaware and the National Science Foundation (NSF) Grant No. 1254540. The government has certain rights in the invention.

FIELD OF THE INVENTION

The subject matter relates generally to carbon nanotube-based sensors to monitor pressure and structural defects, and a manufacturing process of fiber composites.

BACKGROUND

There is an ever-increasing demand for optimized, integrated and sustainable autonomous systems. Conventional devices and sensors need to be modified and adapted to be integrated with modern systems and their unique requirements. For example, traditional pressure sensors with mechanical diaphragm and hydraulic fluids are being replaced by piezoelectric, capacitive or piezoresistive pressure sensors.

Most conventional pressure sensors have been based on diaphragms that convert pressure to motion of a mechanical element, and were thick and bulky. A few other recent types of pressure sensors include hydraulic, piezoelectric, capacitive and resistive. Hydraulic sensors are not thin and flexible, and traditional piezoelectric sensors are not suitable for static measurements due to the decay of charge. Commonly used piezoresistive sensors are elastomer-based conductive composites, which are popular due to low cost, stretchability, flexibility, and ease of fabrication.

Hence, there exists a need for cost effective pressure sensors for various applications, where due to surface complexity and lack of space, the pressure sensor is flexible, thin, and provides a wide range of pressure sensing capability.

Composite materials have been largely applied in the aerospace, defense, and civil applications due to their excellent mechanical properties. Production of high quality composite parts and minimization of defective parts are goals the composites manufacturers seek to achieve to maintain a robust industry of composites manufacturing. Therefore, a need exists in composites production for a non-invasive sensing system that is able to conduct process monitoring of manufacturing composite materials.

Recently, a variety of non-destructive evaluation techniques have been studied for detecting cracks, deformation and damage occurring in solid structures. Conventional structural health monitoring techniques, such as fiber optics and acoustic emission sensors, suffer from variations and errors between theoretical predictions and practical data, as well as a smaller detection area. Most of these conventional techniques also have an invasive nature in which the integration or utilization of the device to implement the technique weakens the mechanical performance of the solid structures due to the internal stress concentrations and distortion of the local structure.

Therefore, there also exists a need for cost effective structural health monitoring sensors that have higher detection sensitivity and resolution without weakening mechanical performance.

BRIEF DESCRIPTION OF THE DRAWINGS

The drawing figures depict one or more implementations, by way of example only, not by way of limitations. In the figures, like reference numerals refer to the same or similar elements.

FIGS. 1A, 1B, 1C and 1D illustrate carbon nanotube-based thin piezoresistive sensors in uncompressed states and compressed states in accordance with aspects of the invention.

DETAILED DESCRIPTION

Figure 2:
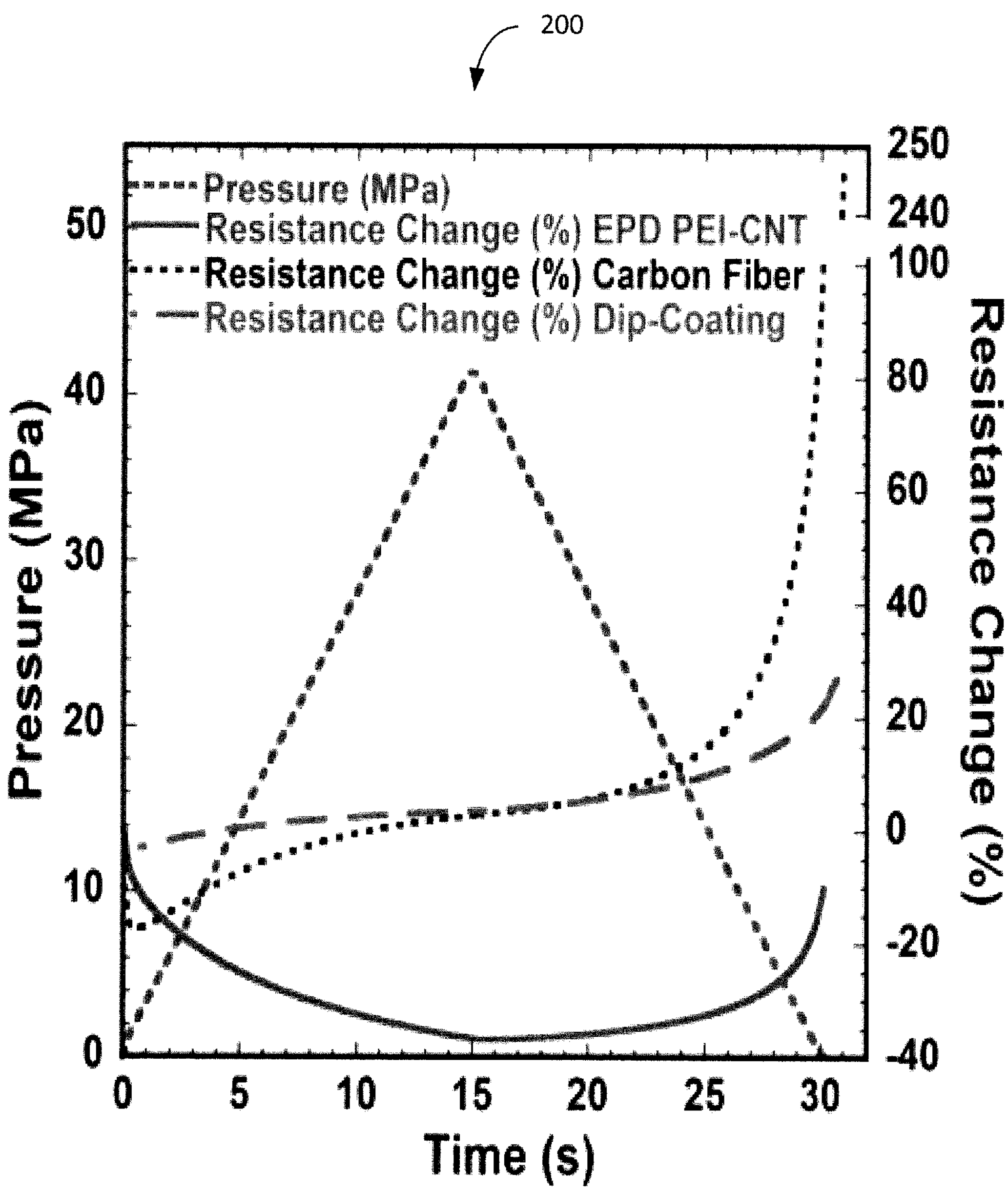
FIG. 2 is a graph comparing change in resistance measurements based upon using carbon nanotube-based sensors manufactured using different processes in accordance with aspects of the invention.

In the following detailed description, numerous specific details are set forth by way of examples in order to provide a thorough understanding of the relevant teachings. However, it should be apparent to those skilled in the art that the present teachings may be practiced without such details. In other instances, well known methods, procedures, components, and/or circuitry have been described at a relatively high-level, without detail, in order to avoid unnecessarily obscuring aspects of the present teachings.

The term "coupled" refers to any logical, optical, physical or electrical connection, link or the like by which signals produced or supplied by one system element are imparted to another coupled element. Unless described otherwise, coupled elements or devices are not necessarily directly connected to one another and intermediate components that my modify, manipulate or carry the signals may separate elements of communication media.

The orientations of the carbon nanotube-based piezoresistive sensor, associated components and/or any devices such as shown in any of the drawings, are given by way of example only, for illustration and discussion purposes.

An example piezoresistive sensor includes a fabric, and carbon nanotubes coated on the fabric. The carbon nanotubes form a network in a plane of the fabric. At least two tap points are coupled to the carbon nanotubes coated on the fabric. A first tap point is separated from a second tap point, where the first and second tap points have an electrical resistance there between. Application of a force on the fabric, from outside the plane of the fabric, causes a change in the resistance between the first and second tap points.

Multi-walled carbon nanotubes are coated on fabrics of different types such as non-woven, woven or knit fabrics. An example of non-woven fabrics include a glass fiber or aramid fiber that includes multiple layers of randomly oriented short fibers. The carbon nanotubes form an electrically conductive percolating network. The resistance of this percolating network is dependent on the contacts between the millions of carbon nanotubes deposited on the fabric. This makes the fabric piezoresistive, i.e., the resistance changes when force is applied on the carbon nanotube coated sensor, which loads/compresses the fabric. Compression causes the fibers in each layer to come in contact with fibers from adjacent layers, which increases the number of contacts between nanotubes. As a result, the application of an out-of-plane force causes a change in the in-plane bulk resistance of the coated fabric. The more that the nanotubes contact each other, the more the bulk resistance of the sensor decreases. In an example, the decrease in resistance is proportional to the amount of force applied. The sensor may be extremely thin, e.g., less than about 1 mm, and may be fabricated using scalable methods to provide sensors capable of covering large areas, i.e., an areal sensor. The fabric of the sensor may be porous, for example, of a porosity of less than 10%-15% fibers by volume. The combination of porosity and thinness of the sensor yields a flexible fabric, e.g., can conform to complex geometries. Such thin, flexible piezoresistive sensors can, for example, detect changes in resistance based upon application of a force or pressure from as low as tactile range (approximately 10 kPa) to body weight ranges and much higher (approximately 40 MPa). In an example, the application of force may additionally or alternatively be derived from a change in pressure of the environment surrounding the piezoresistive sensor.

The sensors may be made, for example, by uniformly coating randomly oriented aramid short fibers with carbon nanotubes using different processing methods. The processing methods include, for example, electrophoretic deposition (EPD) and dip or size coating. The carbon nanotube coating makes the aramid fibers conductive. The sensors can be used in a variety of applications, such as, for example, sensing skin for robots to detect forces in tactile ranges, for higher pressure ranges for human motion detection, for example, in a mat or carpet, as a shoe insert or as a wearable piece of clothing.

Carbon nanotubes offer a unique opportunity to create multifunctional materials because of their distinctive properties. Carbon nanotubes are an ideal candidate for multifunctional materials because of their ability to achieve simultaneous enhancements in mechanical, thermal and electrical properties over a wide range. Carbon nanotubes may be used to improve mechanical properties of materials such as fracture toughness, fatigue life, vibration damping, and interlaminar strength for composites; thermal properties such as heat transfer; energy storage and harvesting; and electrical properties enables functions such as actuation, EMI shielding and sensing. The fundamental electromechanical response of carbon nanotubes make carbon nanotubes a good choice of material to be used as a sensor.

Carbon nanotubes are remarkably resilient and exhibit very high structural flexibility. They can be bent through large angles and strains without mechanical failure. The capability of carbon nanotubes to change between different buckled morphologies enables them to withstand and sustain large local strains without sacrificing their mechanical integrity. They resist failure under repeated bending. Reversible, periodic buckling of nanotubes are consistent with calculations extrapolated from continuum mechanics. These extraordinary properties make carbon nanotubes ideal for use in pressure sensors, where they are subjected to a variety of complex compression and bending forces. The ability to sustain repeatable bending and large strains enable a repeatable piezoresistive response when the pressure sensor is loaded multiple times.

Carbon nanomaterials have been added to many different kinds of polymers to create conductive polymers that are piezoresistive. These conductive polymers are popular because of their ease of processing, mechanical flexibility and low cost. But, these sensors are sensitive only for a small pressure range and are time dependent. The amount of nanomaterials that can be added is also limited by increasing viscosity of the polymer. To overcome this issue, an example of an aspect of the disclosed invention uses fabric based pressure sensors.

In the EPD process for coating the carbon nanotubes on, for example, a non-woven fabric of aramid fiber with randomly oriented short fibers, the carbon nanotubes are treated with ozone and polyethyleneimine (PEI), which gives the carbon nanotubes a positive change. The treated carbon nanotubes are then deposited on the fabric using a DC current source. In an example, commercially available multi-walled carbon nanotubes grown using chemical vapor deposition (for example CM-95 Hanwha Nanotech Korea) were dispersed in ultra-pure water using a novel ultrasonication and ozonolysis approach. Two grams of carbon nanotubes are added to 2 liters of ultra-pure water. After Ozone functionalization and sonication for 16 hours, the nanotubes were functionalized with 2 grams of PEI (Mw: 25,000, Sigma-Aldrich). PEI has a high-natural pH in solution, but the addition of a mild acid allows the amine groups to protonate, forming a stable solution of positively charged carbon nanotubes. The PEI functionalized nanotube solutions were adjusted to a pH of 6 using glacial-acetic acid (Sigma-Aldrich). The stable carbon nanotube solutions were used to deposit nanotubes on the non-woven aramid fabric. The non-conductive aramid fabric was placed over the stainless steel cathode (316 SS McMaster-Carr) under slight tension with the help of elastic bands to ensure intimate contact with electrode for uniform deposition of carbon nanotubes. The deposition was carried out under direct current (DC) field strength of 22V/cm.

When a dip coating process is used, for example, the aramid fibers are dipped in a solution of carbon nanotube sizing diluted with ultra-pure water, for a predetermined time, for example, 10 minutes, after which it was flipped and kept for another predetermined time, for example, 10 minutes. Next, the dipped aramid fabric is dried in a convection oven for about 15 minutes at a predetermined temperature, for example, 150° C. After drying, the aramid fabric is laminated on plastic sheets.

Reference now is made in detail to the examples illustrated in the accompanying drawings and discussed below. FIGS. 1A, 1B, and 1C illustrate a working concept of carbon nanotube-based thin piezoresistive sensors in compressed and uncompressed states. FIG. 1A depicts the sensor in an uncompressed (unloaded) state with multiple fiber layers 102. Three distinct fiber layers 102 are depicted in FIG. 1A, however, the fiber layers 102 may represent multiple pseudo layers within a woven fabric. The squiggly black lines represent the carbon nanotube 104 coating of these fibers 102.

FIG. 1B is an alternate view of the carbon nanotubes 104 coating the fibers 102. In the uncompressed state illustrated in FIG. 1B, the coated fibers do not contact one another. FIG. 1C illustrates an example of a compressed (loaded) state for the sensor in which a traverse out-of-plan force 106 is applied. As the sensor is compressed, the coated fibers 102 in adjacent layers move closer to each other, which causes the carbon nanotubes 104 deposited on its interface to come in contact with other carbon nanotubes 104, as illustrated in FIG. 1D. Thus, an application of a traverse out-of-plane force 106 (e.g., where the received force is normal to the plane of the fabric) causes an increase in the number of contacts between the carbon nanotubes, which leads to a relatively large change in the in-plane bulk resistance.

FIG. 2 illustrates the results of a test conducted to measure the change in resistance with respect to applied pressure and the phenomenon of a large resistance change for carbon nanotubes-based sensors Ruined using: an EPD process, a dipping process, and short carbon fibers without coated carbon nanotubes thereon. In FIG. 2, a pressure from 0-about 40 MPa is applied. Each of the specimens were laminated using a commercially available laminator using a 5 mills thick laminating sheet with precut holes for electrodes. For conducting electrical measurements, at least two points (tap points) where the readings for the electrical measurements may be taken are coupled to the plurality of carbon nanotubes coated on the fabric. In an example, tap points/electrodes may be applied to a nanotube coated aramid fabric using a high conductive silver paint (for example, SPI supplies). Wires are attached to the tap points/electrodes using a 2-part conductive epoxy resin, for example, Epoxies 40-3900, to keep the contact resistance to a minimum. Electrical measurements were made using a high sensitive voltage-current meter. A constant source voltage was applied to the specimens during the testing and the current was measured to calculate the change in resistance. In another example, a plurality of tap points/electrodes may be coupled along a boundary of the plurality of carbon nanotubes coated on the fabric. The plurality of tap points create a pressure map by mapping the change of resistance between the plurality of tap points along the boundary of the fabric.

The resistance of the short carbon fibers without coated carbon nanotubes initially decreases until the pressure is about 2 MPa. This initial decrease in resistance is due to increase in contact points (compression) between the short carbon fibers. Beyond about 2 MPa, the resistance starts to increase until 40 MPa. The short carbon fibers are damaged and break into smaller pieces due to higher load, which in turn causes the increase in resistance. The carbon fiber is brittle; hence bending it over the curvature of another fiber causes it to fracture. Upon unloading (uncompressing), the resistance keeps increasing. At the end of the test of FIG. 2, there is permanent change in resistance of about 250% (as illustrated on the right side of the graph). During the initial part of the unloading cycle (reducing the applied pressure), the short carbon fibers start decompressing and the contact points formed during the compression start breaking. The resistance increases at a much faster rate towards the end of the unloading cycle as the carbon fibers decompress and the smaller pieces of the carbon fiber lose contact with each other.

For the dipping process sample illustrated in FIG. 2, initially there is decrease in resistance on loading due to increase in contact points between nanotube coated aramid fibers. With additional loading, the resistance increases due to damage caused to the aramid fibers and disruption of the carbon nanotube coating. During the unloading cycle, the resistance keeps increasing as the coated aramid fibers lose contact with each other. At the end of the unloading for the dip/sizing sample, there is a permanent increase in baseline resistance of about 25%.

For the EPD process sample illustrated in FIG. 2, there is a steady decrease in resistance throughout the loading cycle and then increase in resistance during the unloading cycle. At the end of the unloading cycle, the baseline resistance decreases by about 10%. This decrease is because there is no damage or breakage of the fibers. The PEI which is used to functionalize the carbon nanotubes during the manufacturing process forms cross-link bonds and creates a compliant interphase which acts like a spongy material covering the fibers and preventing damage to the fibers. The permanent decrease in resistance is due to the compression of the carbon nanotube-PEI coating and the compression of the non-woven aramid fabric. The decrease in resistance notes better consolidation of carbon nanotube-PEI coating. Therefore, the EPD sample is likely to give a more repeatable response as compared to the dip/sizing and short carbon fiber where there is random and uncontrolled fiber breakage.

The ability to measure an extremely high range of pressure along with the flexibility and thinness presents a variety of applications for the above-described carbon nanotube-based piezoresistive sensors. Specifically, in the field of human motion detection the sensors can be integrated into wearable articles of clothing and shoe wear, or in robotics where the sensors can permit a 'feel' of the environment; from holding or moving a delicate object or performing a more complex task that requires sensing a higher pressure. The carbon nanotube-based piezoresistive sensor further provides an ease of scalability through use of the electrophoretic deposition process to make larger sensors. As a result, the carbon nanotube-based piezoresistive sensor provides a thin, flexible pressure sensor which can detect low pressures in the tactile range to very high pressures by coating a non-woven aramid with carbon nanotubes.

Aspects of the invention enables on-line, in situ process monitoring of manufacturing fiber composites as a measure of vacuum level, resin flow and polymer cure, which has not previously been accomplished in the composites manufacturing industry. A sensing sheet with locally integrated carbon nanotubes, as discussed above, may be produced that is thin, light weight and highly porous in the form of nonwoven fabric (i.e., a "smart sensor") offering excellent scalability and application flexibility that it is able to be embedded into fabric preforms in essentially any size and shape prior to fabrication process. The carbon nanotube-based nonwoven sensing sheet (1) is piezoresistive and therefore is sensitive to vacuum pressure; (2) covers the full body of a composite part with the micron-level nanotube-fiber sensing network that is inherently-formed based on the random fiber architecture of the selected nonwoven carrier fabric; (3) instantaneously responds to the movement and phase changes of the resin matrix as quantitatively shown as the real-time electrical resistance changes; (4) is noninvasive to the overall structural integrity of the composites to be monitored and can either be integrated directly in the composite or used as a sacrificial process layer in a form of a sensing peel ply; and (5) is capable of forming the distributed sensing network that significantly increases the coverage rate and probability of detection for large composite parts in comparison with the industrially applied point sensors. Accordingly, aspects of the invention presents a simple, effective and economical method to monitor the overall manufacturing process of composite that can be readily integrated into existing processes of composites manufacturing industry.

Figure 3:
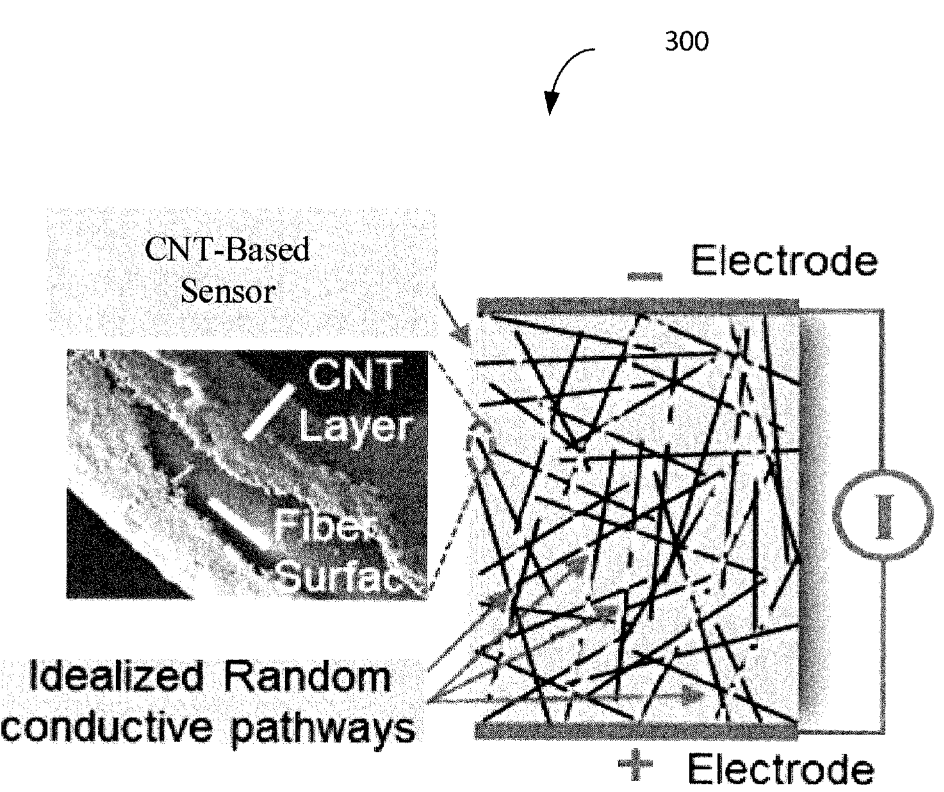
FIG. 3 illustrates carbon nanotubes coating the fibers of a fabric, and the random pathways of the network formed in a plane of the fabric in accordance with aspects of the invention.

FIG. 3 illustrates carbon nanotubes coating the fibers of a fabric, and the random pathways of the network formed in a plane of the fabric. The carbon nanotube-based sensor of FIG. 3 takes advantage of the random fiber architecture of, for example, the nonwoven fabric. By depositing carbon nanotubes on the surface of the fabric, an electrically-isotropic nanotube network is formed on the surface of the fibers. The micrograph image on the left side of FIG. 3 displays the nanotube coating wrapping around the fibers of the fabric. As schematically illustrated in FIG. 3, the random conductive pathways are established as the electrical current is sourced between the two electrodes. In this way, the electrical resistance of the carbon nanotube-based sensor can be recorded continuously in real-time. Here, any physical or/and chemical change to the nanotube network can influence the formed conductive pathways which can be quantitatively measured as the electrical resistance change of the sensor. As for monitoring the manufacturing process of composites, all fabrication procedures (including vacuuming, resin infusion, curing and post-curing) can cause certain changes to the configuration of the nanotube-based conductive network within the sensor. For example, during the vacuuming process, the sensing sheet is compressed by the vacuuming pressure, resulting in an increased amount of conductive pathways through the neighboring nanotube-coated fibers, measured as the increase in electrical resistance. Therefore, constantly measuring the resistive response of the sensor can detect the process transitions in situ when manufacturing fiber composites.

FIGS. 4A, 4B, 4C, and 4D are examples of a unidirectional glass fiber preform, sensing scheme, apparatus used for process monitoring a composite panel integrated with the carbon nanotube-based sensor, and a drawing showing the VARTM setup. Experiments were performed to examine the use of the sensor as an in-situ process monitoring sensor for manufacturing glass fiber composites. The central concept is that a 6-ply unidirectional glass fiber composite panel is fabricated under the vacuum-assisted-resin-transfer-molding (VARTM) process and the carbon nanotube-based sensor sensor is embedded into the fabric preform to create a planar sensing area that can cover the whole panel. The composite material may be any fiber-reinforced polymer (FRP) made of a polymer matrix reinforced with fibers, where the fibers may include glass, carbon, aramid, or basalt. Additionally, the electrical response of the CNT-based sensor is measured continuously during the entire manufacturing process.

Figures 4A, 4B, 4C, 4D:
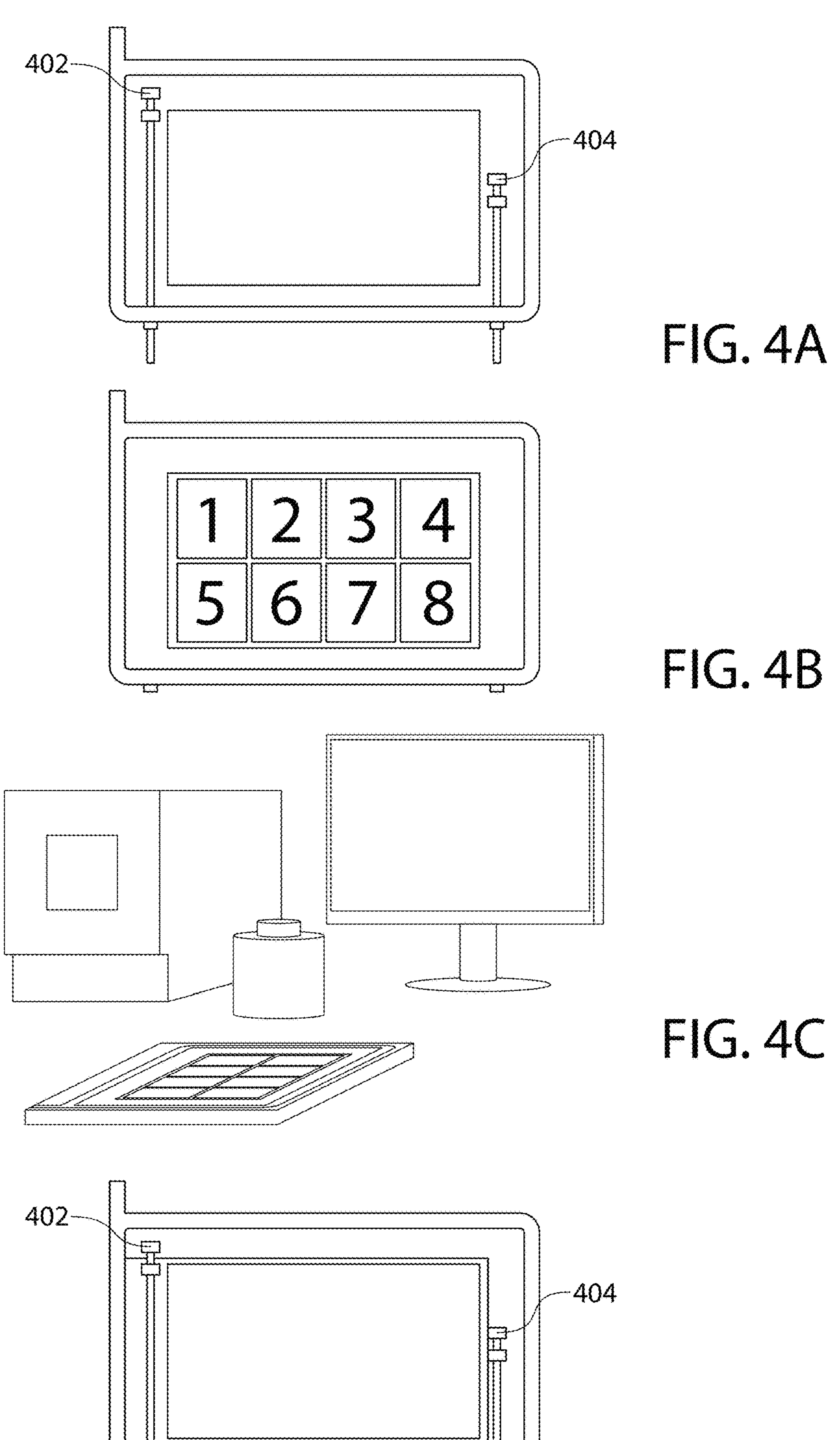
FIGS. 4A, 4B, 4C, and 4D are examples of a unidirectional glass fiber preform, distributed sensing scheme, apparatus used for process monitoring a composite panel integrated with the carbon nanotube-based sensor, and a drawing showing the VARTM setup, in accordance with aspects of the invention.

FIG. 4A shows the glass fiber preform, which is, for example, 6.5 in. wide and 12 in. long with the unit weight of 9 oz/yd$^2$/ply. In one example, the glass fiber preform is positioned within a soft-sided vacuum chamber (e.g., a vacuum bag) including at least one surface that deforms under vacuum pressure to apply a compaction force on the glass fiber preform. The soft-sided vacuum chamber may be positioned within a pressure vessel (e.g., an autoclave) to provide higher compression forces. FIG. 4B illustrates an example of a sensing scheme of two rectangular sensors with eight sensing regions that cover the entire fiber preform (left to right regions 1-4 are included in the first sensor and regions 5-8 are included in the second sensor for duplicate validation). FIG. 4C displays apparatus used for the experiment, for example, a convection oven (upper left portion of drawing), vacuum pump (center), and data acquisition (DAQ) system (upper right portion of drawing). The sensors are shown at the bottom portion of the drawing. In addition, over region 1 and part of region 2, a high permeability layer was added to allow resin to flow rapidly while the rest of the flow area had a much lower flow permeability. FIG. 4D provides a drawing of the VARTM setup under the full vacuum. After maintaining vacuuming for a predetermined time, for example, 20 min., resin was injected from the left inlet 402 and flowed to a right direction at room temperature towards outlet 404. As resin infusion is completed, the VARTM setup was transferred to the convection oven to cure the composite part at, for example, 135° C. for 4 hours followed with post-cure at, for example, 175° C. for 2 hours. The entire 14-hour manufacturing process finished after ramping temperature down to the room temperature. The sensing regions can either be integrated directly into the fabric preform (i.e., permanently embedded in the composite parts after manufacturing) or used as a sacrificial process layer in the form of sensing peel ply (i.e., a removable layer directly contacting with the surface of the composite parts to be manufactured).

Figure 5:
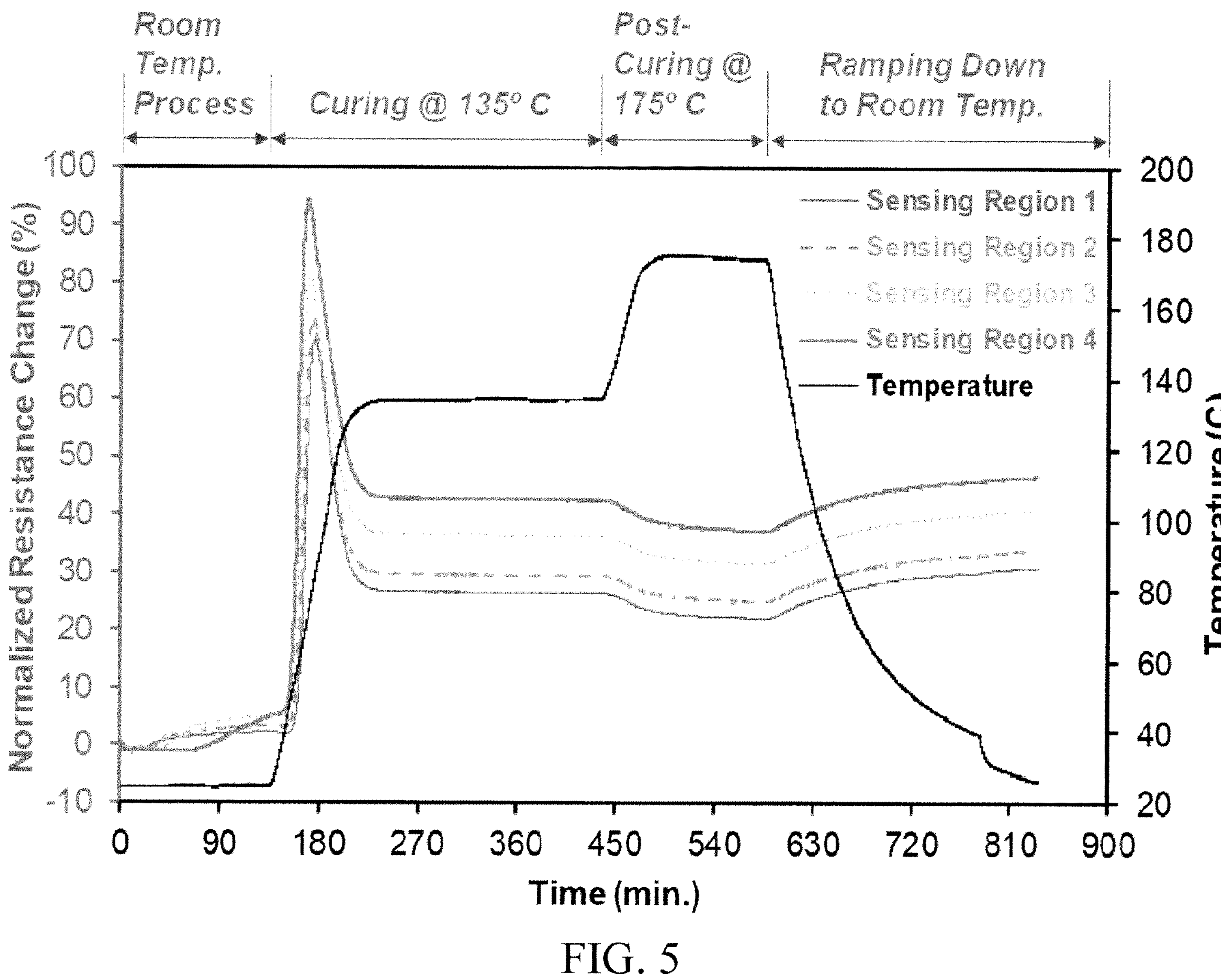
FIG. 5 is a graph of the experimental data collected during testing of the carbon nanotube-based sensors to monitor processing procedures of the composite panel of FIGS. 4A, 4B, 4C, and 4D FIGS. 6A and 6B are examples of four distributed sensing regions in FIG. 5 during a room temperature process including specific data of vacuuming and resin infusion where the sensor directly measures the vacuum level and the resin flow front in real time.

FIG. 5 is a graph of the experimental data collected during testing of the carbon nanotube-based sensors to monitor processing procedures of the composite panel of FIGS. 4A, 4B, 4C, and 4D. In FIG. 5, the bulk responses of all four sensing regions (1 to 4) display very similar and instant trends in accordance to all processing procedures indicating the excellent sensitivity and repeatability of the sensors as monitoring the manufacturing processes. The sensoring is responding to the entire manufacturing process including (1) the vacuuming and infusion process at room temperature (a physical process); (2) curing process at elevated temperature (a chemical process); (3) post-curing process (a chemical process); and (4) ramping down process (a physical process), which are quantitatively demonstrated as the electrical resistance change of the sensor in real time.

Figures 6A, 6B:
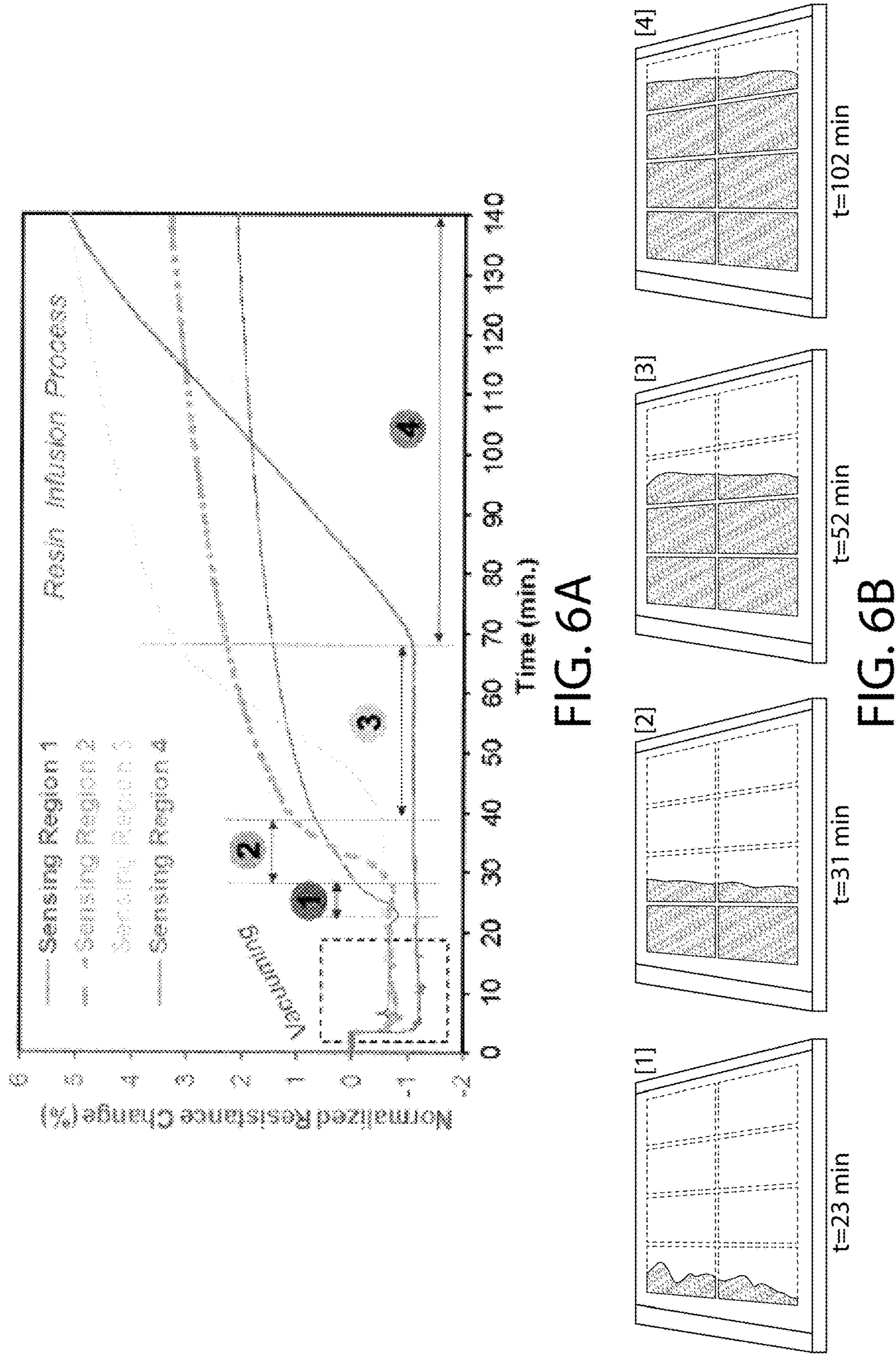

FIGS. 6A and 6B are examples of four sensing distributed regions of FIG. 5 during a room temperature process including specific data of vacuuming and resin infusion where the sensor directly measures the vacuum level and the resin flow in real time. In particular, the room temperature process including vacuuming and resin infusion is illustrated in FIG. 6A. All four sensing areas show an amount of decrease in electrical resistance during vacuuming, which is reasonable since the sensor is under compression as vacuum pressure increases. Additionally, the transient sensing response shows distinct increase as resin starts to flow through the sensing regions. It can be seen that it increases at nearly constant slope and the time-lag between consecutive sensing areas (marked as the double-arrow lines) closely correlates the infusion time taken over the sensing area which is in a good matching with the drawings [1]-[4] in FIG. 6B taken at different stages of resin flow. In particular, the increase in slope in the filling region shows the distributed nature of the carbon nanotube-based sensor, where the response changes as the flow front progresses. Additionally, this nearly linear resistance increase correlation is a promising and convenient quantitative measure that can be used to locate the resin front.

Carbon nanotube-based structural health monitoring and damage detection methods are based on the formation of electrically percolating networks surrounding structural fibers. The carbon nanotubes with diameters on the order of 10 nm and outstanding mechanical/electrical properties such as high strength, high stiffness and high electrical conductivity can form a nerve-like conductive network that is minimally invasive to the solid structure. Local structural damage or deformation will change the electrical properties of the carbon nanotube network. When combined with microwave/millimeter wave technologies, the incident and reflected signals can both be collected, compared and analyzed by the sensor to evaluate the location and damage severity occurring in the solid structures.

In another example, the carbon nanotube-based sensors may be used in a time domain reflectometry (TDR) sensing system for distributed structural health monitoring (SHM) and non-destructive evaluation (NDE) of solid structures. The carbon nanotube-based sensors can be attached to the surface of existing structures to detect the ex-situ damage and deformation, or embedded inside structures for in-situ sensing.

When employed in structural components, the sensors can potentially provide real-time information on structural health without adding weight or degrading performance. The sensors can be easily integrated within the composite structure during the composite manufacturing process, similar to that described above, and do not affect the composite material properties. Two dimensional mapping of strain and damage can be achieved by the TDR sensing system including the carbon nanotube-based sensors.

Carbon nanotubes, which may be ink-jet printed, are used as the transmission lines for the TDR sensing system. By ink-jet printing carbon nanotubes onto glass fabric and subsequently consolidating into a composite, a highly repeatable geometry and electrical conductivity is achieved for the transmission line. The transmission lines are connected to an electrical time domain reflectometry (TDR) module. The electrical TDR technique involves generating a high-frequency electromagnetic pulse through a pair of conductors and subsequently detecting the reflection. Electrical discontinuities along the transmission line result in reflected waveforms. When the local electrical properties of the transmission line are changed, due to either strain or the formation of micro-scale cracks, the electrical discontinuity can be detected in the reflected pulse.

The integration of the non-invasive carbon nanotube-based sensors at each layer enable damage sensing throughout the composite structure. An analysis of impedance data from the sensors can provide damage location, damage mechanism, etc. which can be used to monitor the structural health of aerospace, ground and marine vehicles, pipelines, cryogenics, pressure vessels, concrete structures, rocks, cables, circuit boards, and other structures.

Figure 7:
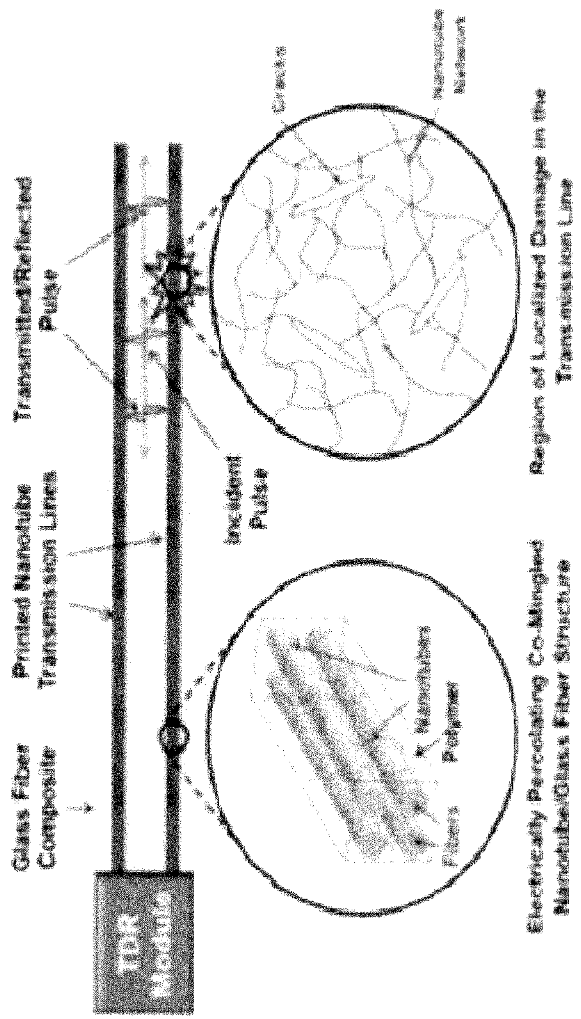
FIG. 7 is an example of carbon nanotube-based transmission lines connected to a TDR module for structural health monitoring, in accordance with aspects for the invention.

FIG. 7 is an example of carbon nanotube-based transmission lines connected to a TDR module for structural health monitoring. The TDR module generates a high frequency pulse, and is connected to printed nanotube transmission lines. By inkjet printing water-based dispersions, the nanotubes are able to penetrate the fiber bundles and form a co-mingled electrically percolating network.

Figure 8:
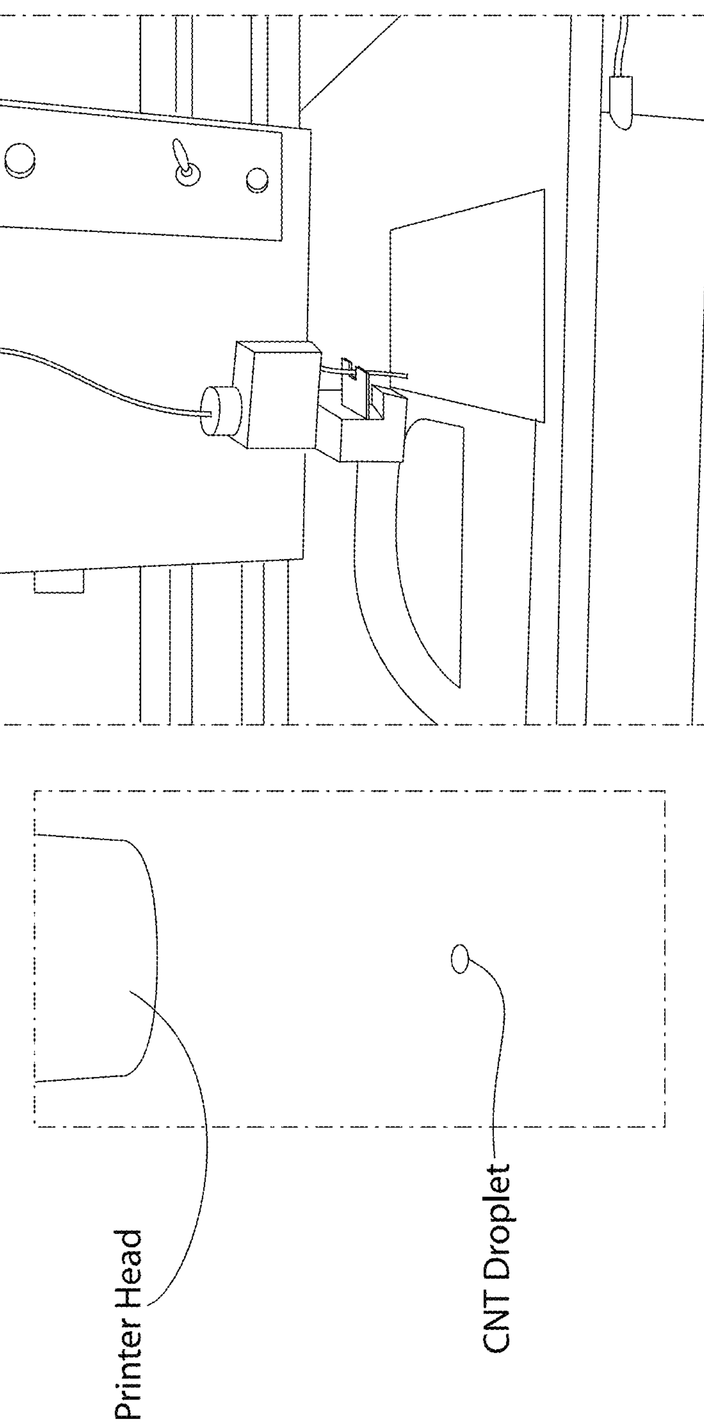
FIG. 8 is an example of the use of inkjet printing for the carbon nanotube transmission lines of FIG. 7.

FIG. 8 is an example of the use of inkjet printing for the carbon nanotube transmission lines of FIG. 7. The process of inkjet printing, as shown in FIG. 8, enables extremely precise control of both the geometry of the sensor, as well as the amount of nanotubes deposited. The ink-jet printing approach permits printing of complicated pathways to control the sensor location, for example, in the final part geometry as the fabric is draped around curved components. Additionally, the sensor sensitivity can be controlled through the localized changes of the printed circuit properties (materials and geometry) affecting the local high-frequency response of the transmission line. As the pulse travels down the transmission line, variations in the local dielectric properties result in reflection that is picked-up by the TDR detector. FIG. 7 shows a region where the composite has been damaged. At the microscopic scale, small cracks break-up the percolating network and the local electrical properties change with the accumulation of damage. The inherent flexibility in inkjet printing enables a wide range of future sensor geometries to be considered.

Figure 9B:
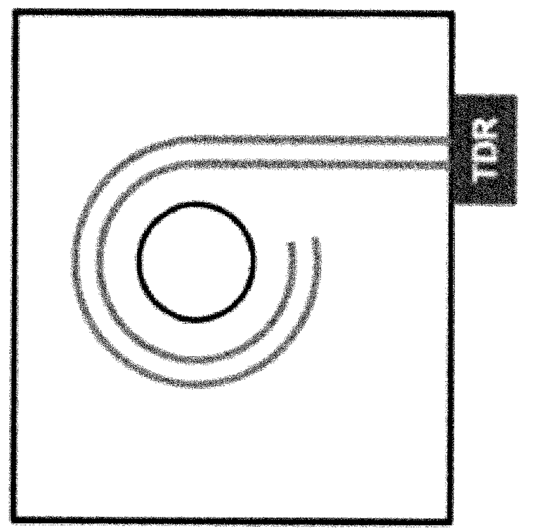
FIGS. 9A and 9B are examples of configurations or sensor geometries where the carbon nanotube-based transmission lines could form a sensing array over a surface sensing area or wrap around a local discontinuity in accordance with aspects of the invention.
Figure 9A:
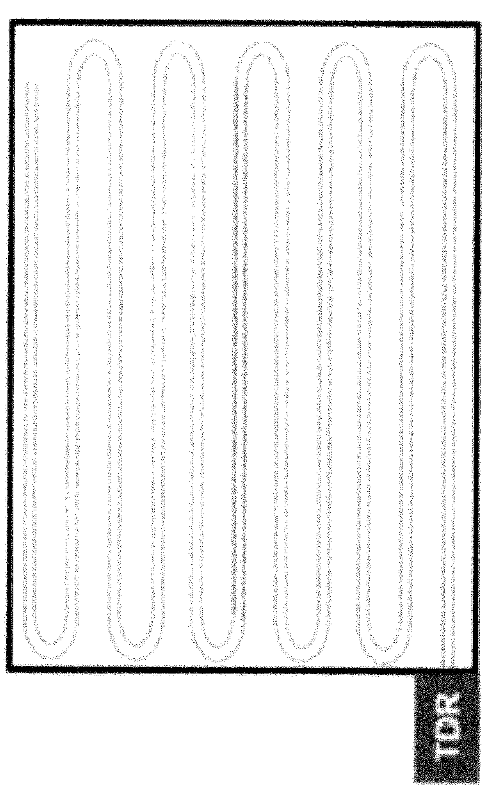

FIGS. 9A and 9B are examples of configurations or sensor geometries where the carbon nanotube-based transmission lines form a sensing array over a surface sensing area or wrap around a local discontinuity. FIG. 9A illustrates a large-area sensing configuration for the carbon nanotube-based transmission lines, and FIG. 9B illustrates an example of carbon nanotube-based transmission lines connected to a TDR for localized sensing around a local discontinuity, such as around a mechanical fastener or around an aircraft window, to localize damage.

Figure 10:
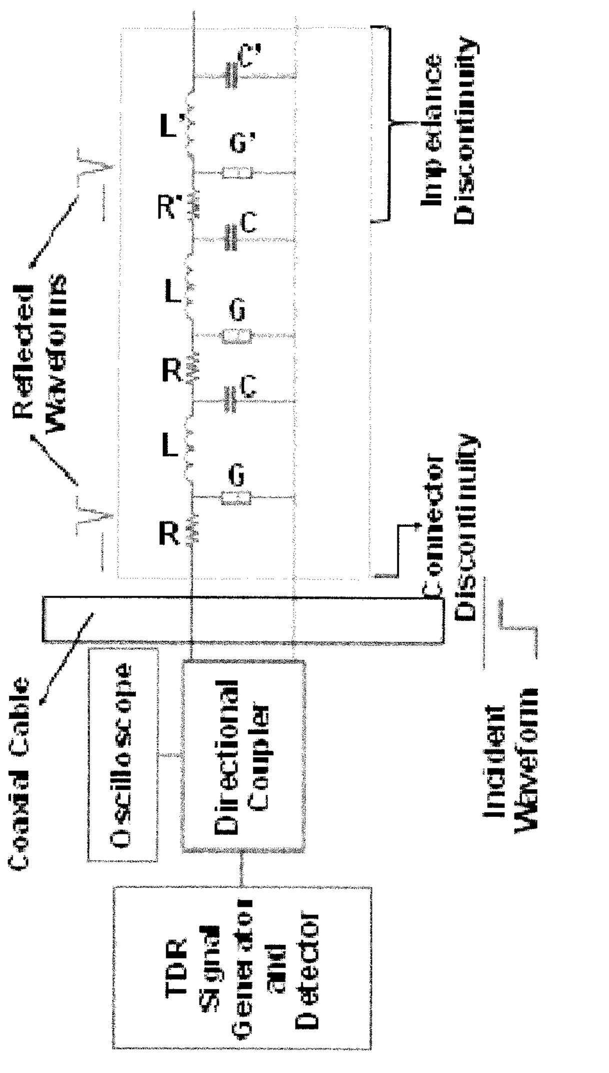
FIG. 10 is an illustration of a TDR measurement arrangement where the transmission line is divided into a series of distributed impedances related to distributed resistance, capacitance, inductance and conductance in accordance with aspects of the invention.

FIG. 10 is an illustration of a TDR measurement arrangement where the transmission line is divided into a series of distributed impedances related to distributed resistance, capacitance, inductance, and conductance. FIG. 10 shows an equivalent circuit diagram of the distributed TDR measurement arrangement. In FIG. 10, the transmission line is divided into a series of distributed impedances. Any changes in the distributed resistance, capacitance, inductance or conductance results in a changed local impedance as represented by a reflected waveform. Because the time domain response is determined by the sensor geometry and its electrical properties, the test allows for reconstruction of the electrical properties along the entire length of the transmission line if the geometry is fixed.

Figure 11:
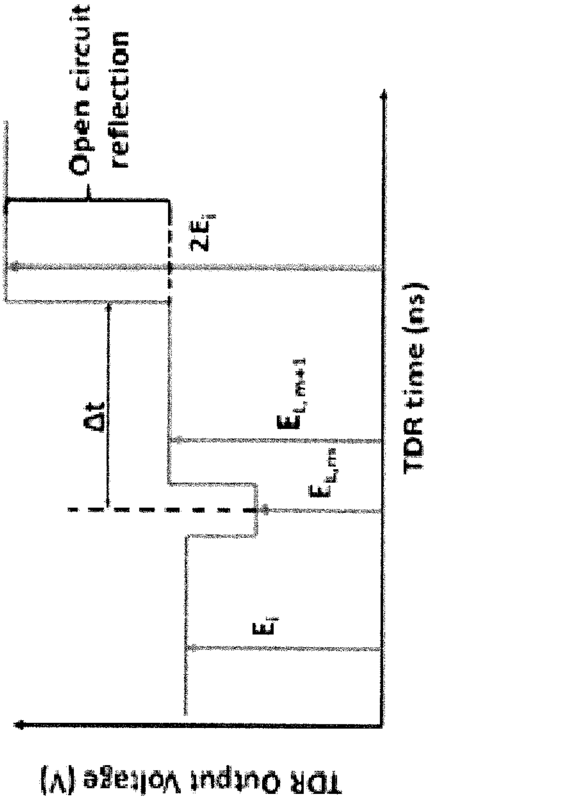
FIG. 11 is an example of a TDR waveform for a uniform transmission line with an impedance discontinuity in accordance with aspects of the invention.

FIG. 11 is an example of a TDR waveform for a uniform transmission line with an impedance discontinuity. The raw TDR signals collected are voltage values, which are then directly converted to impedance values. Based on the impedance distribution along the transmission line, the TDR module generates a voltage vs. TDR time plot. The TDR response of an arbitrary transmission line with a single discontinuity located at m and an open circuit at the end of the transmission line is illustrated in FIG. 11. The output voltage at $m^{th}$ location, $E_{L,m}$ and incident voltage, $E_i$ are related where $Z_{module}$ is the module impedance:

$$E_{l,m} = E_i\left(\frac{2Z_L, m}{Z_{cable} + Z_{L,m}}\right)$$

Figure 12B:
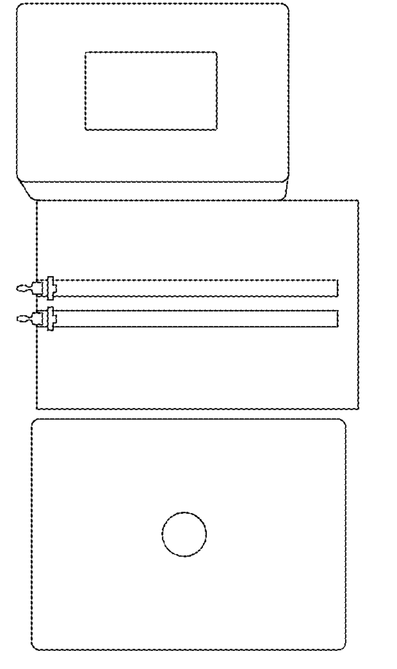
FIGS. 12A, 12B, 12C and 12D are examples of carbon nanotube-based sensors and a composite with embedded sensors in accordance with aspects of the invention.
Figure 12A:
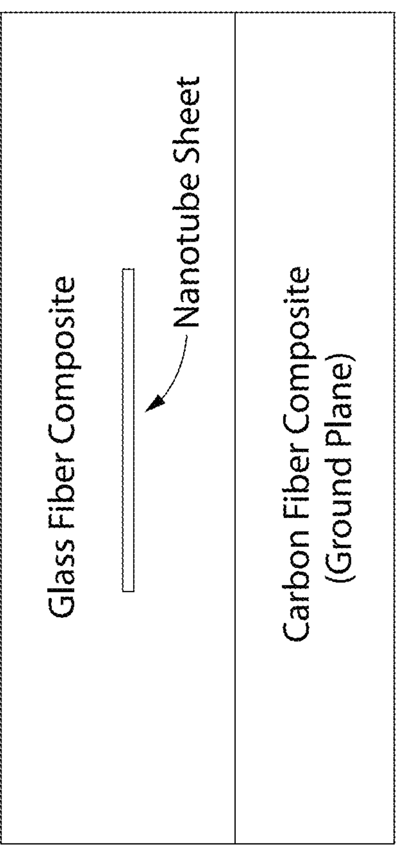

FIGS. 12A and 12B are examples of a carbon nanotube-based sensor and a composite with embedded sensors. FIG. 12A shows the sensor configuration. Each carbon nanotube transmission line is connected to a Sub-Miniature version A (SMA) connector for TDR measurement. FIG. 12B shows a cross-section of the embedded nanotube transmission line and fiber composite laminate with two embedded sensors. A drawing of an iPad Air laptop computer (left portion of drawing) and a TDR module (right portion of drawing) are included in FIG. 12B to provide a scale reference.

Figures 12C, 12D:
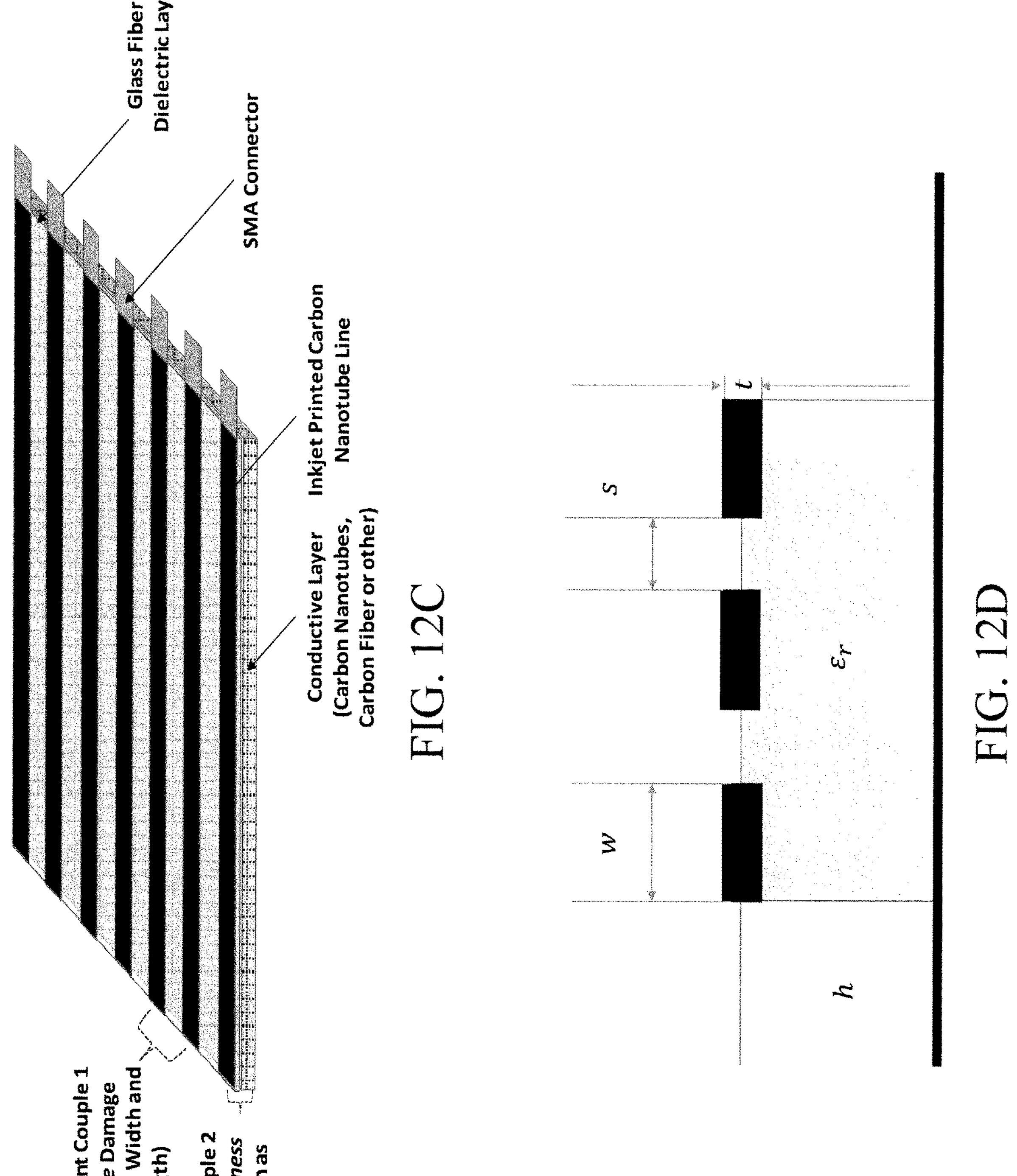

FIG. 12C is an illustration of the TDR sensor design that includes multiple carbon nanotube lines patterned directly by inkjet printing onto the fiber composite dielectric layer as well as another integrated conductive layer consisting of carbon materials such as carbon fibers or carbon nanotubes.

Measurements conducted between printed carbon nanotube lines on the same layer can offer in plane info such as width and length of damage, while measurement conducted between the integrated conductive layer consisting of carbon materials and printed carbon nanotube lines can give through-thickness info such as depth of the damage. Multiplex measurement and combination of these data can quantify the dimensions of damage in a 2D/3D way.

For a local impedance value, described with reference to FIG. 12D, impedance is related to both the local material properties and dimensions (such as the thickness of the dielectric layer, the width/diameter/thickness of the printed lines). Most of the other factors will not change or will only have negligible changes, except the height of the dielectric layer, h, and the distance between transmission lines, s, which will be affected if deformation or damage occurs. Calculations for determining impendance will be understood by one of skill in the art from the description herein.

The TDR results report both the impedance distribution along the transmission lines and the location of any damage. The location of each single value can be determined since both the propagation speed and travel time of the signal are known. The following equation can be used to find the spatial location of the damage in the transmission line, in which Δx is the distance from the signal input end of the transmission line, Δt is the round travel time of the signal, L is the distributed impedance and C is the distributed capacitance:

$$\Delta x = \frac{\Delta t}{2\sqrt{LC}}$$

When sending and collecting TDR signals, at least two transmission lines are always required. We are actually measuring and summarizing the information of multiple "points" along the transmission lines. FIG. 12D is also an example of each "point" in a cross-section view. When we couple two carbon nanotube lines as transmission lines, we focus on measuring s-related dimensional changes; When we couple a carbon nano tube line and a conductive layer (forming a transmission line), we can determine h-related dimensional changes. A one dimensional transmission line modeling based algorithm has been used to calculate the impedance response of the transmission line.

Figure 13:
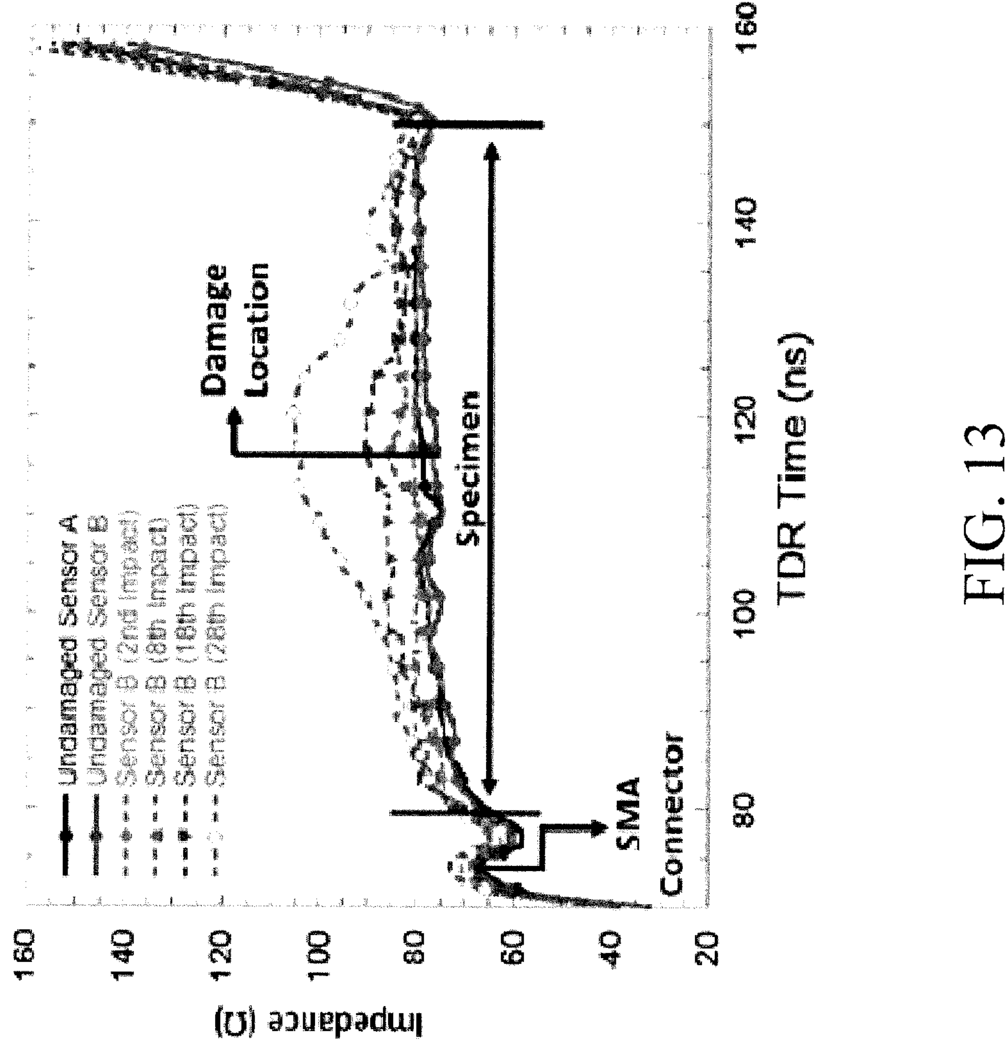
FIG. 13 is an example of TDR responses of two carbon nanotube-based transmission lines and a carbon conductive ground layer under repeated impact in accordance with aspects of the invention.

FIG. 13 is an example of TDR responses of two carbon nanotube-based transmission lines and a carbon conductive ground layer under repeated impact. In FIG. 13, TDR data from localized impact, for example, a $2^{nd}$ impact, $8^{th}$ impact, $18^{th}$ impact and $28^{th}$ impact on a nanotube transmission line is illustrated. Under repeated low energy impact, the carbon nanotube sensor shows a significant change in the TDR response. The local change in impedance results from breaking-up of the nanotube network. The data in FIG. 13 illustrates the high degree of sensitivity to micro-cracking and the potential to pinpoint the location of damage along the length of the sensor.

Figure 14:
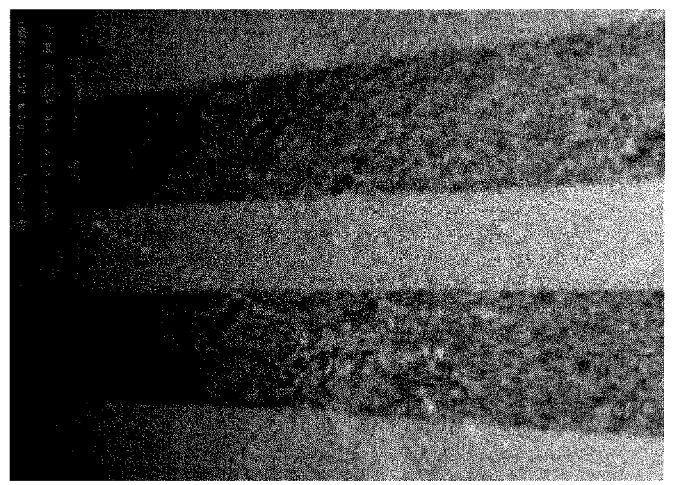
FIG. 14 is an image providing an example of two carbon nanotube-based transmission lines before impact and after fifty-six joules of impact of FIG. 13 in accordance with an aspect of the invention.

FIG. 14 is an image providing an example of two carbon nanotube-based transmission lines before impact and after 56 joules of energy of impact of FIG. 13. As shown in the image of FIG. 14, after the $28^{th}$ impact, damage is barely visible.

Additional Details and Examples

In an example, a scalable electrophoretic deposition (EPD) approach is used to create thin, flexible and lightweight carbon nanotube-based textile pressure sensors. The pressure sensors are produced using a variety of natural and synthetic fibers. The piezoresistive sensors are sensitive to pressures ranging from the tactile range (<10 kPa), in the body weight range (~500 kPa), and very high pressures (~40 MPa). The EPD technique enables the creation of a uniform carbon nanotube-based nanocomposite coating, in the range of 250-750 nm thick, of polyethyleneimine (PEI) functionalized carbon nanotubes on non-conductive fibers. Non-woven aramid fibers may be coated by EPD onto a backing electrode followed by film formation onto the fibers creating a conductive network. The electrically conductive nanocomposite coating is bonded to the fiber surface and shows piezoresistive electrical/mechanical coupling. The pressure sensor displays a large in-plane change in electrical conductivity with applied out-of-plane pressure. In-plane conductivity change results from fiber/fiber contact as well as the formation of a sponge-like piezoresistive nanocomposite "interphase" between the fibers. The resilience of the nanocomposite interphase enables sensing of high pressures without permanent changes to the sensor response, showing high repeatability.

These sensors may be used for applications where surface complexity, thickness limitations and sensitivity are critical, such as electronic skin, soft robotics, human-machine interfacing electronic gloves, touch detection, biomedical devices and prostheses, and human motion analysis.

In an example, a simple, light-weight, breathable and conformable textile pressure sensor detects pressures in a gentle touch range as well as very high pressures. A highly efficient and scalable electrophoretic deposition (EPD) process is used to deposit multi-walled carbon nanotubes under an electric field from a water-based dispersion at room temperature. The process is based on the mobility of the carbon nanotube under an applied electric field where the surface of the nanotube is functionalized with dendritic polyelectrolyte polyethyleneimine (PEI). The PEI protonates with the addition of a mild acid and develops a positive surface charge that stabilizes the dispersion and enables cathodic deposition. Placing non-conductive fibers in direct contact with a metallic electrode enables carbon nanotubes to deposit under a direct current (DC) electric field and create uniform, dense films of carbon nanotubes on the surfaces of the fibers. Experimental observations show that the nanotubes deposit first on the electrode and conductive nanotube films then grow over the fibers as an extension of the electrode.

Figure 15B:
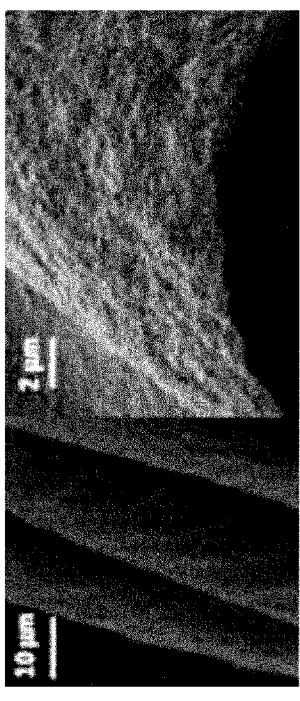
FIG. 15B is a SEM micrograph images of PEI-CNT deposited on wool fibers in accordance with aspects of the invention.
Figure 15A:
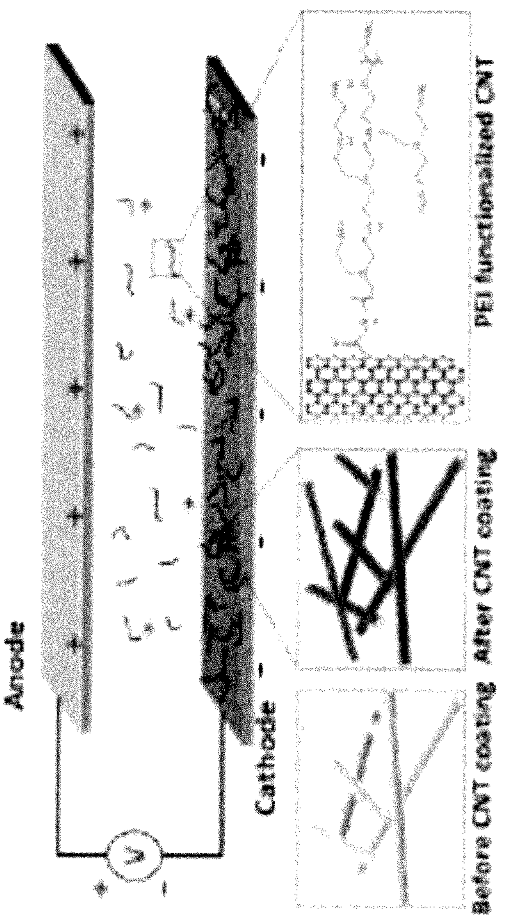
FIG. 15A is a schematic diagram of the EPD process to deposit PEI-CNT on a non-woven aramid fiber in accordance with aspects of the invention.

FIG. 15A is a schematic diagram of the EPD process to deposit PEI-CNT on a non-woven aramid fiber. The amine groups in the PEI form covalent bonds with the oxide groups on the nanotube surface as well as functional groups on the surfaces of fibers. The PEI functionalization, approximately 25% by weight, acts as the polymer matrix and creates a porous, flexible, and electrically conductive nanocomposite film on the fiber surface.

FIG. 15B are electron micrographs of the PEI-CNT deposited films with PEI functionalized carbon nanotubes on both wool (left image) and aramid (right image) fibers, showing a uniform, dense coating on the fiber surfaces. The wool fibers have a scale-like cuticle structure that is still visible in the coated fibers, and the aramid fibers, cross-sectioned with a focused ion beam (FIB), show the uniformity of the coating.

Figure 15D:
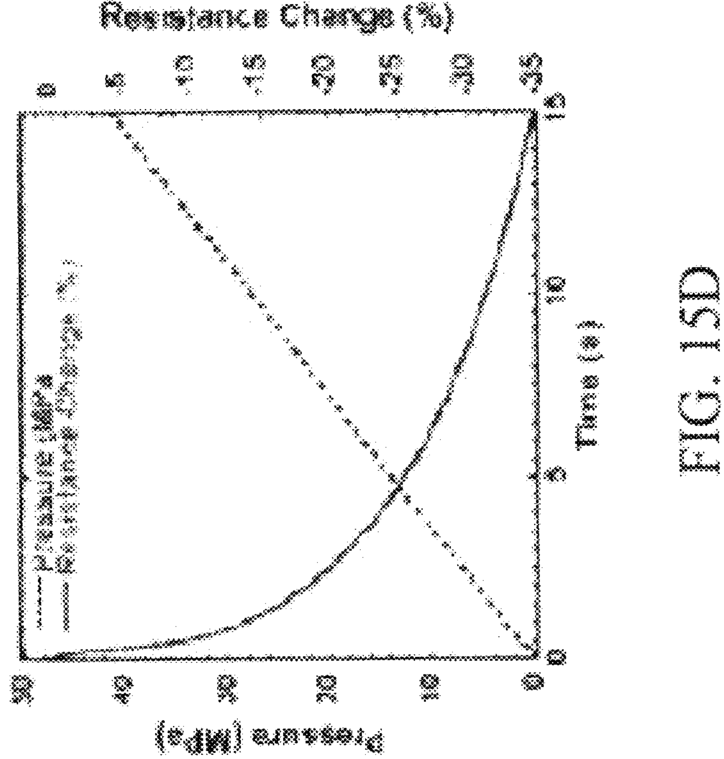
FIG. 15D is a graph of the resistance response of the EPD PEI-CNT sensor in accordance with aspects of the invention under a range of pressure sensing from 0 to 40 MPa.
Figure 15C:
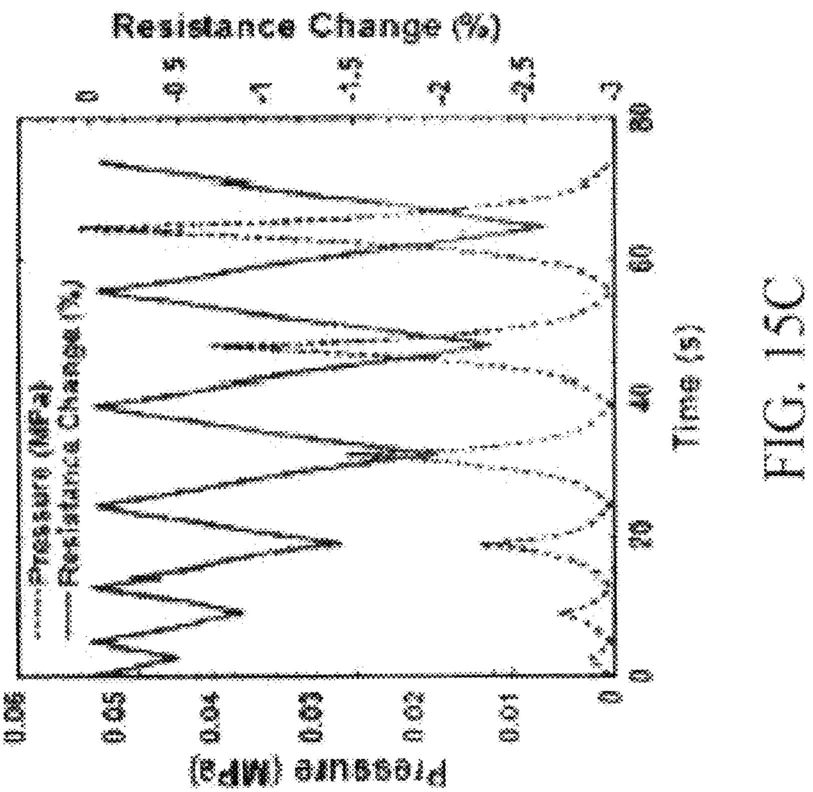
FIG. 15C is a graph of the resistance response of the EPD PEI-CNT sensor in accordance with aspects of the invention subjected to low pressures in a tactile and object manipulation range.

FIG. 15C is a graph illustrating resistance response of the EPD PEI-CNT sensor under low pressures in the tactile and object manipulation range. In FIG. 15C, the sensitivity of the textile-based nanocomposite sensor is illustrated under pressures in the tactile range (0.0025-0.0525 MPa).

FIG. 15D is a graph illustrating resistance response of the PEI-CNT sensor during a wide range of pressure sensing. In FIG. 15D, sensing capability at pressures from 0 to 40 MPa are illustrated. The sensor response is linear at low pressures, but becomes non-linear at higher pressures. The non-linear response is likely a consequence of the two different mechanisms that influence the in-plane electrical response under pressure. The formation of fiber-fiber contacts initially dominates the overall electrical response due to the compressibility of the fabric at low pressures. At higher pressures, the electrically conductive network of nanotubes on the surface of the aramid fibers is compressed. The compression results in a continued decrease in resistance due to the piezoresistive response of the compliant sensor interphase. The piezoresistive response of the carbon nanotube interphase is due to the nanotube-nanotube tunneling resistance within the film. The electrically percolating network of nanotubes on the surface of the fibers changes due to local compression. The compressive stress in the film at the fiber crossover results in a local decrease in the film electrical conductivity. As a result, the resistance at the fiber-fiber contacts decreases with continuously applied pressure.

The sensor has an extremely versatile range of pressure measurement and can detect low pressures in the tactile range (<10 kPa) to object handling and maneuvering (10-100 kPa) and very high pressures (~40 MPa). The textile based flexible pressure sensor has use applications ranging from the creation of smart textiles and clothing that can be used for human motion analysis and biomedical prosthesis to e-skins for robots to enable robotic sense or touch, as well as high pressures for object maneuvering and manipulation.

Figure 16C:
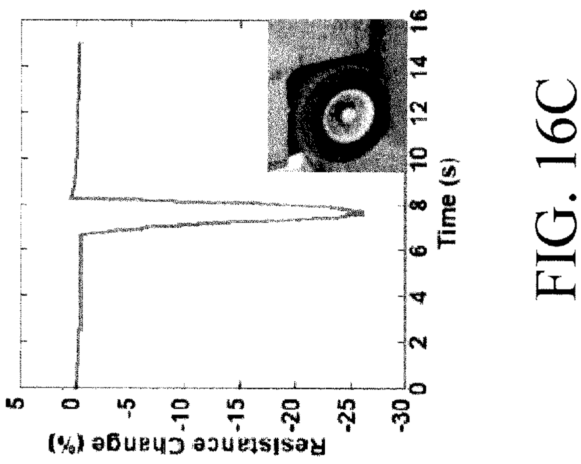
FIGS. 16A, 16B, and 16C are graphs illustrating change in resistance and pressure detection due to various applied pressure.
Figure 16B:
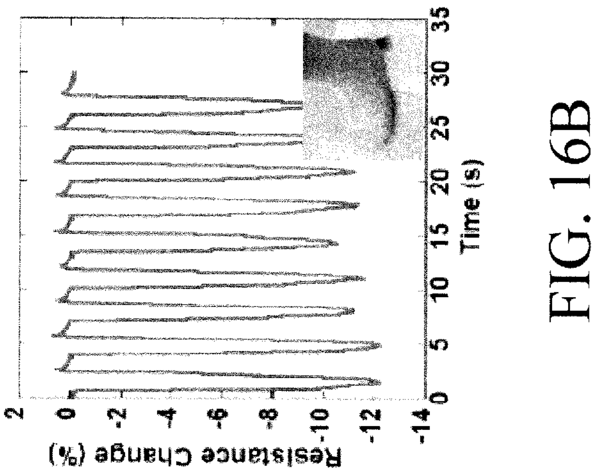
Figure 16A:
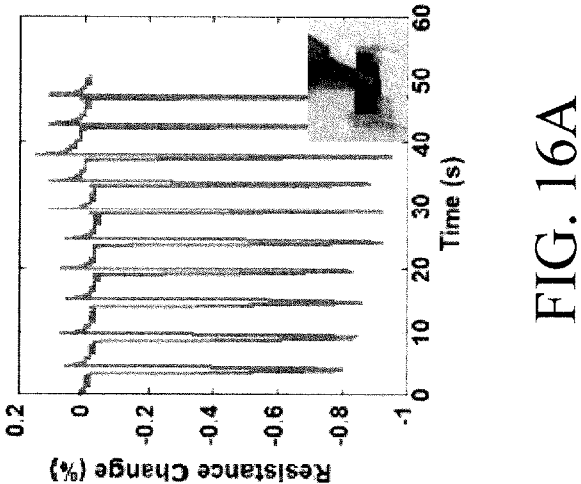

FIGS. 16A, 16B, and 16C are graphs illustrating change in resistance and pressure detection by the sensor due to various applied pressure. FIG. 16A illustrates a pressure detection by the carbon nanotube-based sensor in a tactile range, e.g., less than 10 KPa, for example, by a human finger, and change in resistance due to the applied force. FIG. 16B illustrates a pressure detection by the carbon nanotube-based sensor due to a body weight force, for example, a foot or object in a range of 10-100 KPa, and change in resistance due to the applied force. FIG. 16C illustrates pressure detection by a carbon nanotube-based sensor due to a change applied force in a range greater than 40 MPa, for example, due to weight of a forklift.

Materials and Processing: Commercially available multi-walled carbon nanotubes grown using chemical vapor deposition (CM-95, Hanwha Nanotech) were dispersed in ultra-pure water using an ultrasonication and ozonolysis approach. Two grams of carbon nanotubes are first added to 2 liters of ultra-pure water and mixed with a magnetic stir bar. The mixture is then cooled to 5° C. in a water bath and a peristaltic pump (Model MU-D01, Major Science) is used to circulate the mixture through an ultrasonic liquid processor with a 12.7 mm diameter horn (Sonicator 3000, Misonix) equipped with a continuous flow cell (800B Flocell, Qsonica) operating at 60 W in a duty cycle with 15 seconds on and 10 seconds off. The total sonication time was 16 hours. During ultrasonication, ozone gas produced by an oxygen concentrator (OxyMax 8, Longevity Resources) and ozone generator (Ext 120-T, Longevity Resources) was bubbled into the mixture at a flow rate 500 ml/minute to oxidize the surfaces of the carbon nanotubes. After ozone treatment and sonication for 16 hours, 2 grams of PEI (polyethyleneineimine, Mw: 25,000, Sigma-Aldrich) is added to the dispersion and sonicated for another 4 hours under the same conditions to functionalize the oxidized nanotubes. The PEI functionalized nanotube dispersions are then adjusted to a pH of 6 using glacial-acetic acid (Sigma-Aldrich) in order to protonate the amine groups and form a stable dispersion of positively charged carbon nanotubes.

To establish the sensing mechanism, carbon nanotube dispersions were used to electrophoretically deposit nanotubes onto a non-woven fabric composed of randomly oriented aramid fibers held together with a binder of cross-linked polyester (20601, 50 g/m$^2$, Technical Fiber Products). These non-woven fabrics, often referred to as surface veils, are commonly used in advanced fiber-reinforced composites for improving the surface finish. The fiber surfaces in a surface veil are configured to be compatible with common polymer matrix materials and were chosen for their compatibility with CNT-PEI functionality established in our prior research. The non-conductive aramid fiber was placed in direct contact with a 316 stainless steel cathode under slight tension with the help of elastic bands to ensure intimate contact with electrode. A counter electrode of the same stainless steel was placed a fixed distance from the cathode using insulating glass/epoxy composite spacers. The assembly was then immersed in the carbon nanotube dispersion and electrophoretic deposition was carried out under direct current (DC) field strength of 22 V/cm for 8 minutes. The coated aramid fabric is then dried in a convection oven for 15 minutes at 120° C.

For comparison, two other specimens were characterized for their sensing response: (1) specimens were prepared by dip-coating the aramid fabric in a commercially-available carbon nanotube sizing and (2) a conductive carbon fiber random mat with random fibers (20301, 50 g/m$^2$ Technical Fiber Products). The sizing specimens were produced by dip coating the aramid fabric in an aqueous solution of commercially available carbon nanotube sizing (SIZICYL™ XC R2G, Nanocyl, Belgium). The solution was prepared by mixing 1 part of sizing with 2 parts of ultra-pure water by weight and mixed in centrifugal mixer (THINKY® ARM-310) at 2000 rpm for 120 seconds and then sonicated for 30 minutes in an ultrasonic bath (Branson® 1510). The aramid fabric was dipped in the solution for 10 minutes after which it was flipped and kept for another 10 minutes followed by drying in a convection oven for 15 minutes at 150° C. The carbon fiber was used ‘as is’ without any treatment.

Sensor Preparation and Characterization: All specimens were 100 mm long and 25.4 mm wide. The specimens were laminated in 0.127 mm (5 mils) thick plastic sheets using a heat laminating machine (Saturn 95, Fellowes). For conducting electrical measurements, electrodes and lead wires attached to the specimen using conductive silver paint (SPI supplies) and a 2 part conductive epoxy resin (Epoxies 40-3900) to keep the contact resistance to minimum. The electrodes were attached at the distance of 6.25 mm from the edge of the specimen. Electrical measurements were made using a voltage-current meter (Keithley 6430 Sub Femtoamp Remote Sourcemeter). A constant source voltage was applied to the specimens during the test and the current was measured to calculate the change in resistance. The measurements were synchronized using a customized LabVIEW program.

An electrically actuated load frame (Instron 8562 with a 100 kN load cell) was used for testing specimens to 40 MPa in a load controlled mode. For applying low pressures, Instron MicroTester 5848 with 500 N load cell was used with displacement rate of 2.54 mm/minute. Scanning Electron Microscopy (SEM) was conducted using an AURIGA™ 60 Crossbeam™ FIB-SEM with an acceleration voltage of 3 kV. The specimens were coated with a thin (~5 nm) conductive layer of Pd/Au to minimize sample charging using a vacuum sputter coater (Denton Desk IV, Denton Vacuum, LLC).

Figure 17A:
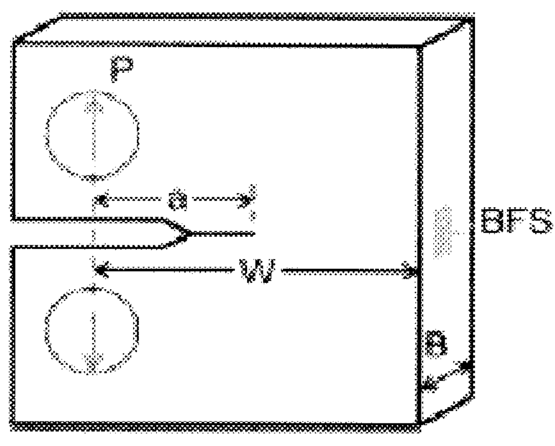
FIG. 17A is a photograph of the carbon nanotube sensor used for detecting the crack formation and propagation and FIG. 17B is a schematic for an integrated approach for simultaneous crack monitoring and strengthening using carbon nanotube sensor and carbon fiber composite.
Figure 17B:
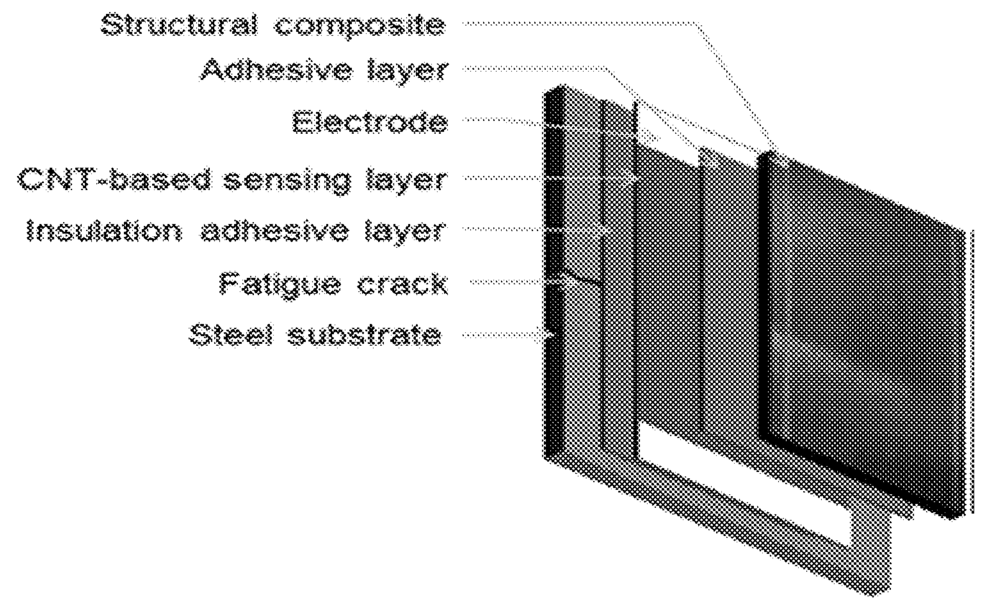

The carbon nanotube based sensor can also be used for detection and propagation of cracks in the structural members of a bridge, dam or any civil infrastructure. FIG. 17A shows a steel specimen subjected to fatigue tests which causes a crack at the center of the specimen. Additional loading cycles cause the fatigue crack to propagate and tear through the sensor and in process, damage the conductive carbon nanotube network. FIG. 17B is a schematic representation of a specimen showing an integrated approach where a carbon nanotube based sensor is used concurrently with carbon fiber for detecting cracks and strengthening the steel. In an example when the sensor (e.g., the CNT based sensing layer of FIG. 17B) is used for a steel structure, an insulation layer is needed so that electrical shorting does not occur between the steel structure and the sensor. As illustrated in FIG. 17B, the CNT-based sensing layer is attached to the steel substrate using the insulation adhesive layer.

Figures 18A, 18B:
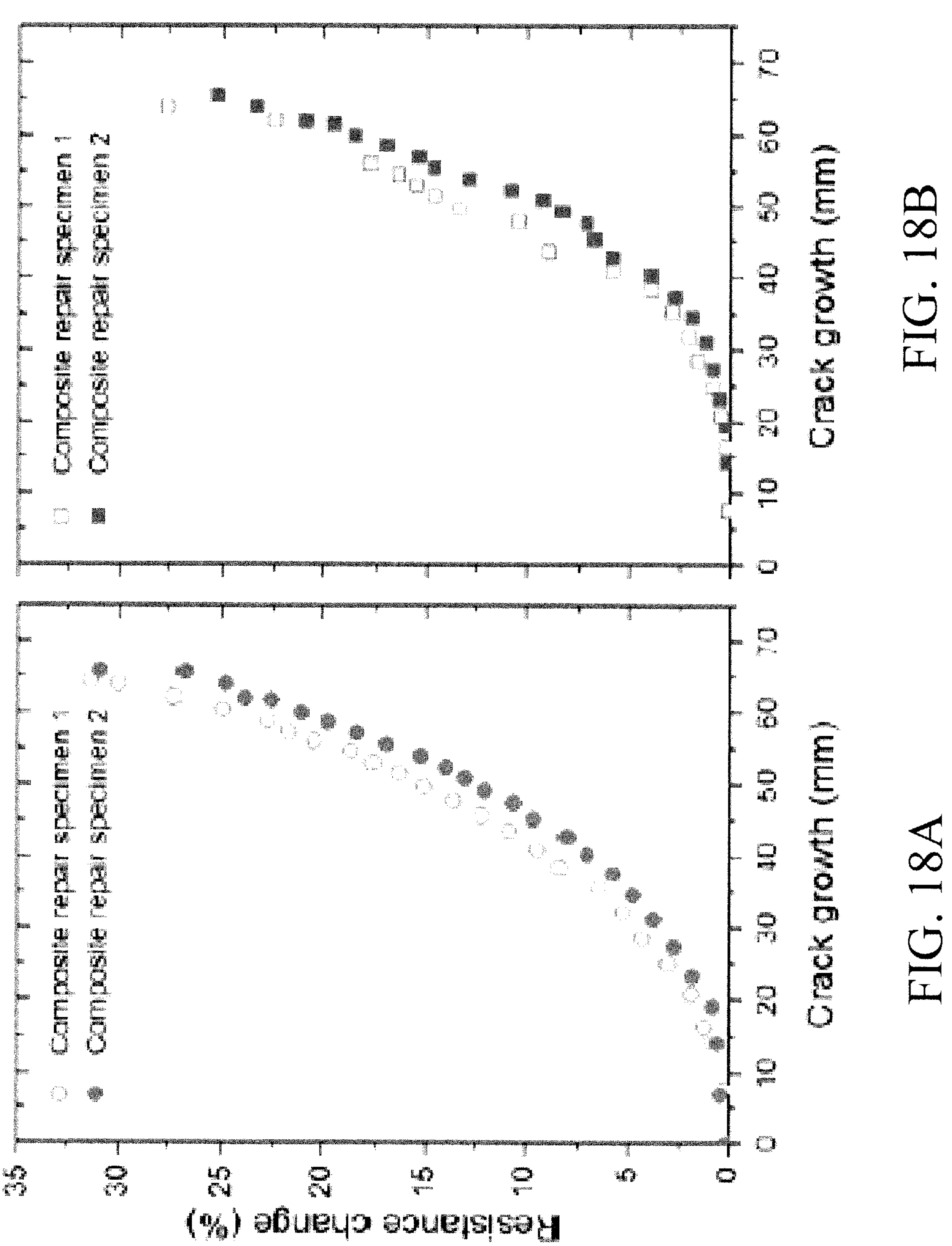
FIGS. 18A and 18B shows a graph illustrating the relationship between resistance change in the CNT-based sensor with increasing crack length in accordance with aspects of the invention. The increase in resistance is due to damage to the sensor, which is proportional to the length of the crack.

FIGS. 18A and 18B show the relationship between the sensor response and fatigue crack growth, demonstrating that the fatigue crack growth in the steel substrate can be monitored directly with the carbon nanotube sensor. FIG. 18A shows the sensor resistance change at the peak of cyclic loading, and FIG. 18B shows the permanent resistance change in the sensor when the specimen is unloaded during the pauses in cyclic loading. Both the peak resistance change and permanent resistance change are similar. The fact that there are similar trends in resistance change at the peak load and in the unloaded state has promising real-world applications because increasing resistance change suggests fatigue crack propagation regardless of the presence, magnitude, or absence of external load. In other words, the resistance change due to load variation within any individual fatigue cycle is insignificant compared to the resistance change due to crack growth. From these results it is clear the sensing approach may monitor deterioration in real-time as well as in periodic inspection.

Figure 19B:
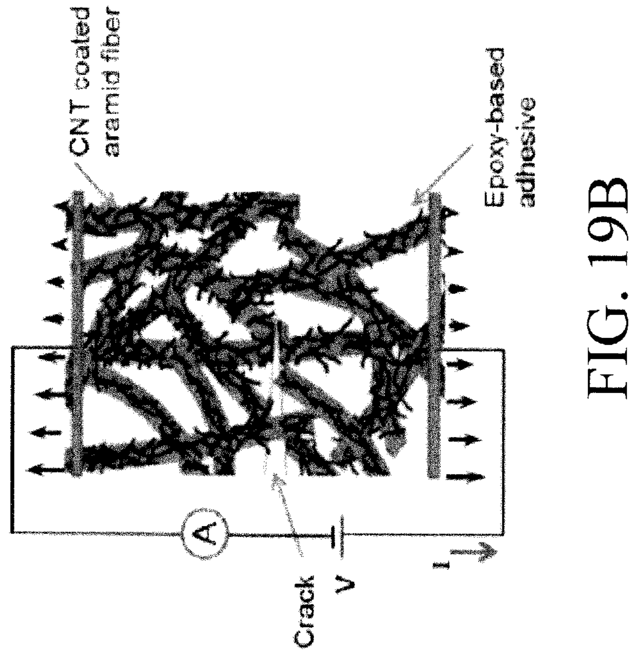
FIG. 19B is a schematic of the same.
Figure 19A:
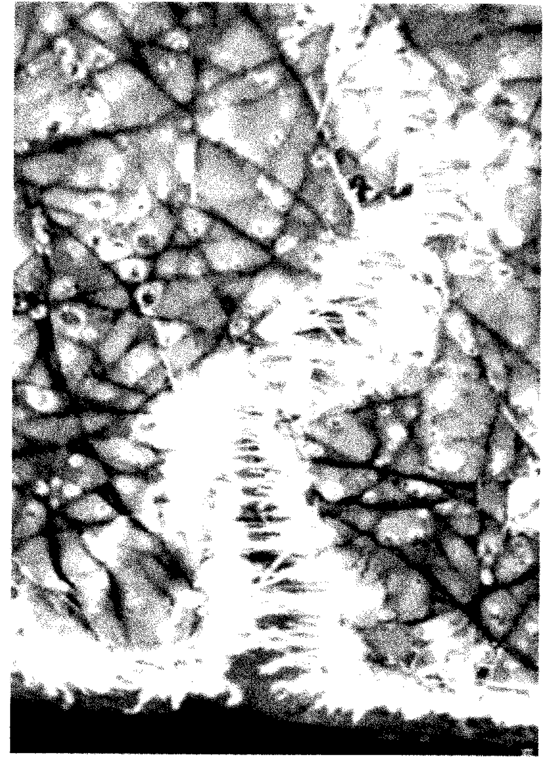
FIG. 19A is an optical micrograph image showing a crack in the CNT-based sensing layer due to crack propagation in the underlying steel substrate in accordance with aspects of the invention.

FIG. 19A is an optical micrograph of the crack in the carbon nanotube based sensor due to the fatigue crack propagation in the underlying steel substrate (FIG. 17A). FIG. 19B illustrates the sensing layer under stress and with a crack severing conductive paths and resulting in changes in the electrical resistance of the carbon nanotube based sensor. The sensor bonded to the steel, experiences deformation due to load transfer between the steel and composite. The propagation of the fatigue crack results in locally high stresses at the crack tip, which results in severing of conductive pathways in the sensor. The growth of the crack then severs conducting pathways resulting in an increase in the sensor's electrical resistance. Thus, the sensor is able to monitor crack initiation and propagation in real-time.

Cracks in a structure may be identified by forming a carbon nanotube coated fabric on the structure, the carbon nanotube coated fabric having a plurality of tap points, monitoring at least one electrical characteristic of the carbon nanotube coated fabric at the tap points, and identifying a crack when a change in the at least one electrical characteristic exceeds a threshold value. In one example, the carbon nanotube coated fabric may be formed by applying a non-carbon nanotube coated fabric on the structure and coating the applied non-carbon nanotube coated fabric with carbon nanotubes to form the carbon nanotube coated fabric. In another example, the carbon nanotube coated fabric may be formed by coating a non-carbon nanotube coated fabric with carbon nanotubes and applying the coated carbon nanotube coated fabric on the structure.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," "includes," "including," or any other variation thereof, are intended to cover a non-exclusive inclusion, such that a process, method, article, or apparatus that comprises or includes a list of elements or steps does not include only those elements or steps but may include other elements or steps not expressly listed or inherent to such process, method, article, or apparatus. An element preceded by "a" or "an" does not, without further constraints, preclude the existence of additional identical elements in the process, method, article, or apparatus that comprises the element.

Unless otherwise stated, any and all measurements, values, ratings, positions, magnitudes, sizes, and other specifications that are set forth in this specification, including in the claims that follow, are approximate, not exact. Such amounts are intended to have a reasonable range that is consistent with the functions to which they relate and with what is customary in the art to which they pertain. For example, unless expressly stated otherwise, a parameter value or the like may vary by as much as +10% from the stated amount.

In addition, in the foregoing Detailed Description, it can be seen that various features are grouped together in various examples for the purpose of streamlining the disclosure. This method of disclosure is not to be interpreted as reflecting an intention that the claimed examples require more features than are expressly recited in each claim. Rather, as the following claims reflect, the subject matter to be protected lies in less than all features of any single disclosed example. Thus the following claims are hereby incorporated into the Detailed Description, with each claim standing on its own as a separately claimed subject matter.

While the foregoing has described what are considered to be the best mode and/or other examples, it is understood that various modifications may be made therein and that the subject matter disclosed herein may be implemented in various forms and examples, and that they may be applied in numerous applications, only some of which have been described herein. It is intended by the following claims to claim any and all modifications and variations that fall within the true scope of the present concepts.

What is claimed is:

1. A method for determining an applied force, the method comprising:

providing a carbon nanotube/fabric-based sensor comprising:

(i) a non-woven fabric featuring multiple layers of randomly oriented non-conductive fibers;

(ii) a plurality of carbon nanotubes coated on the non-conductive fibers, the plurality of carbon nanotubes forming an electrically conductive network in a plane of the fabric;

(iii) at least two tap points/electrodes coupled to the plurality of carbon nanotubes coated on the fabric, a first of the at least two tap points/electrodes separated from a second of the at least two tap points/electrodes, the first and second tap points/electrodes having an electrical resistance there between; and (iv) wherein the carbon nanotube/fabric based sensor is sufficiently flexible as to conform to a complex geometry;

receiving a force applied to said carbon nanotube/fabric-based sensor, the force being applied out of the plane of the fabric of the sensor, the force causing a decrease in the electrical resistance as coated fibers in adjacent layers of said multiple layers come into contact with one another, thereby increasing the number of contacts between carbon nanotubes;

measuring the decrease in electrical resistance between said first tap point/electrode and said second tap point/electrode; and determining the force applied to the plurality of carbon nanotubes coated on the fabric from outside the plane of the fabric from the measured decrease in electrical resistance.

2. The method of claim 1, wherein the received force includes a component that is normal to the plane of the fabric.

3. The method of claim 1, wherein the plurality of carbon nanotubes coated on the fabric form a shoe insert or a mat and wherein the received force is applied by a foot of a person.

4. The method of claim 1, wherein the applied force arises from a change in the pressure of the environment surrounding the fabric.

5. The method of claim 1, wherein said fabric is drapeable over a curved component.

6. The method of claim 1, wherein said fabric comprises a glass fiber or an aramid fiber.

7. The method of claim 6, wherein said fabric comprises 10 to 15 percent by volume of said fiber.

8. The method of claim 1, wherein the fabric and the plurality of carbon nanotubes form a robotic skin, or a wearable piece of clothing.

9. The method of claim 1, wherein said decrease in electrical resistance of the carbon nanotube/fabric sensor is proportional to an applied force on the sensor.

10. The method of claim 1, wherein said decrease in electrical resistance is sensed from the application of force which creates a pressure in a tactile range of less than 10 KPa, object handling and maneuvering ranges of 10 KPa to 100 KPa, and high pressure of approximately 40 MPa.

11. The method of claim 1, wherein said at least two tap points/electrodes includes a plurality of tap points/electrodes, and further wherein at least some of the plurality of tap points/electrodes are coupled along a boundary of the plurality of carbon nanotubes coated on the fabric, wherein a pressure map is created by mapping the decrease of electrical resistance between the plurality of tap points/electrodes along the boundary of the fabric.

12. The method of claim 1, wherein the fabric has a thickness of less than 1 mm.

13. The method of claim 1, further comprising:

prior to the plurality of carbon nanotubes being coated on the fabric, treating the plurality of carbon nanotubes with ozone and polyethyleneimine (PEI) using electrophoretic deposition (EPD).

14. The method of claim 1, wherein the nanotubes coated on the fabric involves a process comprising:

dipping the fabric in a solution of the plurality of carbon nanotubes and ultra pure water for a predetermined time at room temperature;

flipping the fabric in the solution for another predetermined time;

drying the dipped fabric; and laminating the coated fabric as thin sheets.

15. A method for determining an applied force, the method comprising:

providing a carbon nanotube/fabric-based sensor comprising:

(i) a fabric featuring porosity and multiple layers of non-conductive fibers, wherein the fabric is one of a non-woven fabric, a woven fabric, or a knit fabric;

(ii) a plurality of carbon nanotubes coated on the non-conductive fibers of the fabric, the plurality of carbon nanotubes forming an electrically conductive network of random conductive pathways in a plane of the fabric;

(iii) at least two tap points/electrodes coupled to the plurality of carbon nanotubes coated on the fabric, a first of the at least two tap points/electrodes separated from a second of the at least two tap points/electrodes, the first and second tap points/electrodes having an electrical resistance there between; and (iv) wherein the carbon nanotube/fabric based sensor is sufficiently flexible as to conform to a complex geometry;

receiving a force applied to said carbon nanotube/fabric-based sensor, the force being applied out of the plane of the fabric of the sensor, the force causing a change in the electrical resistance by causing a change in the degree of contact among the carbon nanotubes in adjacent layers of said multiple layers;

measuring the change in electrical resistance between said first tap point/electrode and said second tap point/electrode; and determining the force applied to the plurality of carbon nanotubes coated on the fabric from outside the plane of the fabric from the measured change in electrical resistance.

16. The method of claim 15, wherein said fabric is breathable.

17. The method of claim 15, wherein the fabric and the plurality of carbon nanotubes form a shoe insert, a mat, a robotic skin, or a wearable piece of clothing.

18. The method of claim 15, wherein a change in resistance of the sensor is proportional to an applied force on the sensor.

19. The method of claim 15, wherein the change in resistance is sensed from the application of force which creates a pressure in a tactile range of less than 10 KPa, object handling and maneuvering ranges of 10 KPa to 100 KPa, and high pressure of approximately 40 MPa.

20. The method of claim 15, wherein said at least two tap points/electrodes comprises a plurality of tap points/electrodes coupled along a boundary of the plurality of carbon nanotubes coated on the fabric, wherein a pressure map is created by mapping the change of electrical resistance between the plurality of tap points/electrodes along the boundary of the fabric.

21. The method of claim 15, wherein the fabric has a thickness of less than 1 mm.

22. The method of claim 15, wherein said non-conductive fibers make up 10 to 15 percent by volume of the fabric.

23. The method of claim 15, wherein said carbon nanotube coating wraps around the non-conductive fibers.

24. The method of claim 15, wherein the non-woven fabric comprises a glass fiber or an aramid fiber.

25. The method of claim 24, wherein the aramid fiber includes randomly oriented short fibers.

26. The method of claim 15, further comprising:

prior to the plurality of carbon nanotubes being coated on the fabric, treating the plurality of carbon nanotubes with ozone and polyethyleneimine (PEI) using electrophoretic deposition (EPD).

27. The method of claim 15, wherein the nanotubes coated on the fabric involves a process comprising:

dipping the fabric in a solution of the plurality of carbon nanotubes and ultra pure water for a predetermined time at room temperature;

flipping the fabric in the solution for another predetermined time;

drying the dipped fabric; and laminating the coated fabric as thin sheets.

28. A method for determining an applied force, the method comprising:

providing a fabric/carbon nanotube-based sensor comprising:

(i) a fabric featuring multiple layers of non-conductive fibers;

(ii) a plurality of carbon nanotubes coated on the non-conductive fibers of the fabric, the plurality of carbon nanotubes forming an electrically conductive network of random electrical pathways in a plane of the fabric;

(iii) at least two tap points/electrodes coupled to the plurality of carbon nanotubes coated on the fabric, a first of the at least two tap points/electrodes separated from a second of the at least two tap points/electrodes, the first and second tap points/electrodes having an electrical resistance there between; and (iv) wherein the fabric/carbon nanotube based sensor is sufficiently flexible as to conform to a complex geometry;

receiving a force applied to said fabric/carbon nanotube-based sensor, the force being applied out of the plane of the fabric of the sensor, the force causing a decrease in the electrical resistance as coated fibers in adjacent layers of said multiple layers come into contact with one another, thereby increasing the number of contacts between carbon nanotubes;

measuring the decrease in electrical resistance between said first tap point/electrode and said second tap point/electrode; and determining the force applied to the plurality of carbon nanotubes coated on the fabric from outside the plane of the fabric from the measured decrease in electrical resistance.

29. The method of claim 28, wherein said fabric comprises a non-woven fabric featuring randomly oriented short fibers.

30. The method of claim 28, wherein said fabric comprises a random fiber architecture.

31. The method of claim 30, wherein the fabric and the plurality of carbon nanotubes form a shoe insert, a mat, a robotic skin, or a wearable piece of clothing.

32. The method of claim 29, wherein said decrease in electrical resistance of the sensor is proportional to an applied force on the sensor.

33. The method of claim 30, wherein the application of force can create a pressure in a tactile range of less than 10 KPa, object handling and maneuvering range of 10 KPa to 100 KPa, or high pressure of approximately 40 Mpa, and further wherein the fabric/carbon nanotube sensor can sense each of these pressure ranges via the decrease in electrical resistance.

34. The method of claim 29, wherein said at least two tap points/electrodes comprises a plurality of tap points/electrodes coupled along a boundary of the plurality of carbon nanotubes coated on the fabric, wherein a pressure map is created by mapping the decrease of electrical resistance between the plurality of tap points/electrodes along the boundary of the fabric.

35. The method of claim 30, wherein the fabric has a thickness of less than 1 mm.

36. The method of claim 28, wherein the fabric is one of a non-woven fabric, a woven fabric, or a knit fabric.

37. The method of claim 36, wherein the non-woven fabric comprises a glass fiber or an aramid fiber.

38. The method of claim 37, wherein the aramid fiber includes of randomly oriented short fibers.

39. The method of claim 37, wherein said fabric comprises 10 to 15 percent by volume of said fiber.

40. The method of claim 29, wherein said fabric/carbon nanotube sensor comprises porosity.

41. The method of claim 30, further comprising:

prior to the plurality of carbon nanotubes being coated on the fabric, treating the plurality of carbon nanotubes with ozone and polyethyleneimine (PEI) using electrophoretic deposition (EPD).

42. The method of claim 29, wherein the nanotubes coated on the fabric involves a process comprising:

dipping the fabric in a solution of the plurality of carbon nanotubes and ultra pure water for a predetermined time at room temperature;

flipping the fabric in the solution for another predetermined time;

drying the dipped fabric; and laminating the coated fabric as thin sheets.

43. The method of claim 15, wherein said force causes a decrease in said electrical resistance.

44. The method of claim 1, wherein said electrically conductive network comprises random conductive pathways.

* * * * *